United States Patent
Aoyama et al.

(10) Patent No.: US 8,264,916 B1
(45) Date of Patent: *Sep. 11, 2012

(54) MICROWAVE ASSISTED MAGNETIC HEAD AND MAGNETIC DISK DEVICE

(75) Inventors: Tsutomu Aoyama, Tokyo (JP); Tetsuya Roppongi, Tokyo (JP); Yoshikazu Soeno, Tokyo (JP); Kiyoshi Noguchi, Tokyo (JP); Isamu Sato, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/045,603

(22) Filed: Mar. 11, 2011

(51) Int. Cl.
G11B 11/00 (2006.01)
G11B 27/36 (2006.01)

(52) U.S. Cl. .............. 369/13.13; 360/31; 360/125.08; 360/125.45

(58) Field of Classification Search .......... 369/13.01, 369/13.13; 360/59, 55, 31, 46, 69, 125, 126, 360/125.45, 125.58, 125.73, 125.03, 234.3, 360/125.08
See application file for complete search history.

(56) References Cited

U.S. PATENT DOCUMENTS

| 6,785,092 B2 | 8/2004 | Covington et al. | |
| 8,027,110 B1* | 9/2011 | Yamanaka et al. | 360/31 |
| 8,081,397 B2* | 12/2011 | Funayama et al. | 360/125.08 |
| 8,094,399 B2* | 1/2012 | Roppongi et al. | 360/55 |
| 2009/0316304 A1 | 12/2009 | Funayama et al. | |
| 2010/0309577 A1* | 12/2010 | Gao et al. | 360/75 |
| 2011/0043943 A1* | 2/2011 | Igarashi et al. | 360/59 |

FOREIGN PATENT DOCUMENTS

| JP | A-2007-299460 | 11/2007 |
| JP | A-2010-003353 | 1/2010 |

OTHER PUBLICATIONS

Y. Wang et al., "Media damping constant and performance characteristics in microwave assisted magnetic recording with circular ac field," *Journal of Applied Physics* 105, 07B902 (2009).

* cited by examiner

Primary Examiner — Ali Neyzari
(74) Attorney, Agent, or Firm — Posz Law Group, PLC

(57) ABSTRACT

A microwave assisted magnetic head of the present invention includes: at least two or more auxiliary coils that are arranged in a periphery of a writing main pole; and microwave current supply means that applies microwave currents to the at least two or more auxiliary coils. The at least two or more auxiliary coils respectively include linear body parts linearly arranged on an ABS side, two of the linear body parts of the at least two or more auxiliary coils are arranged in a substantially orthogonal positional relationship, and the microwave current supply means is configured such that the microwave current supply means changes phase differences of the microwave currents applied respectively to the at least two or more auxiliary coils. Therefore, the microwave current can be easily controlled, and thus, a circularly polarized magnetic field with high magnetization inversion efficiency can be generated as an assistance magnetic field.

9 Claims, 16 Drawing Sheets

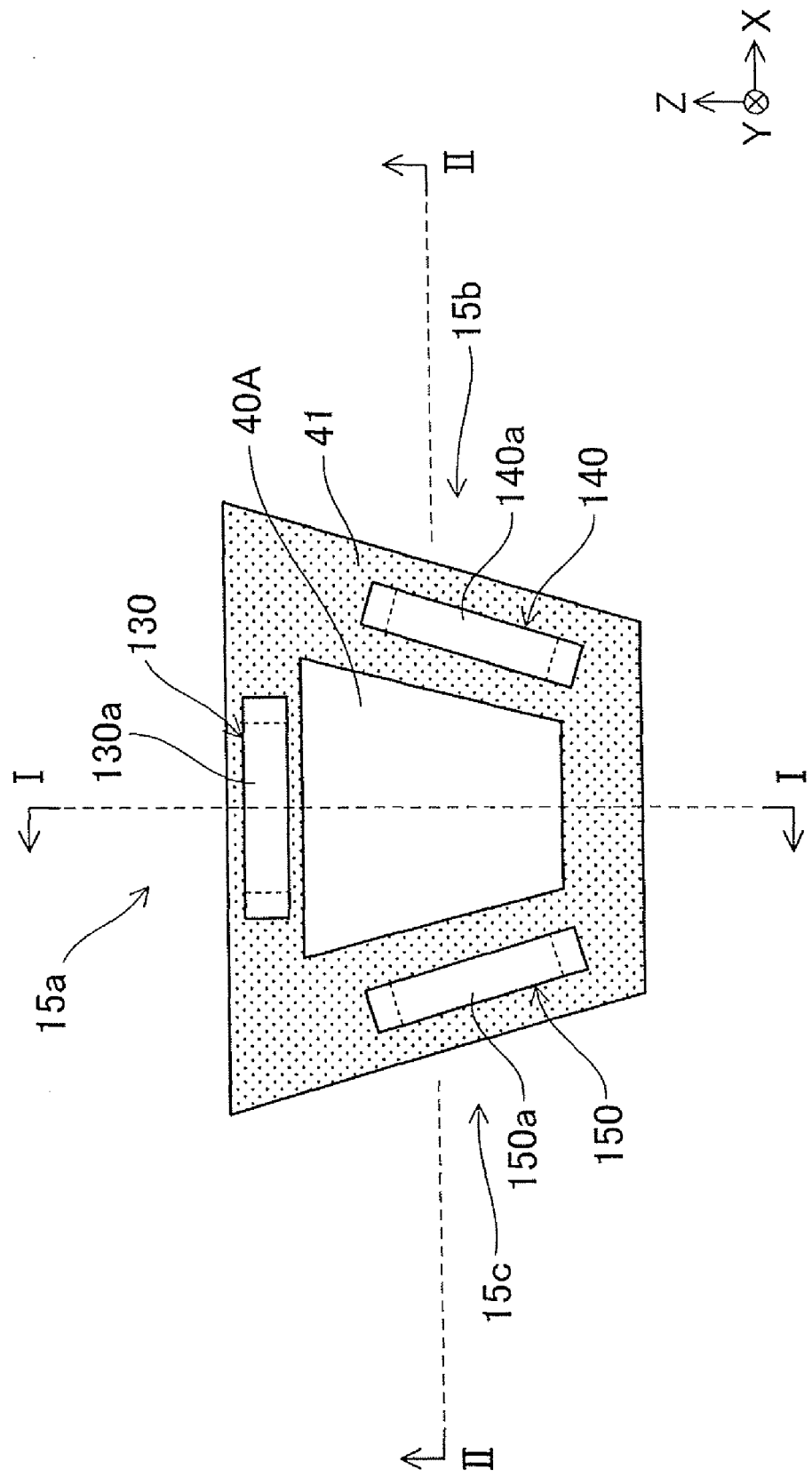

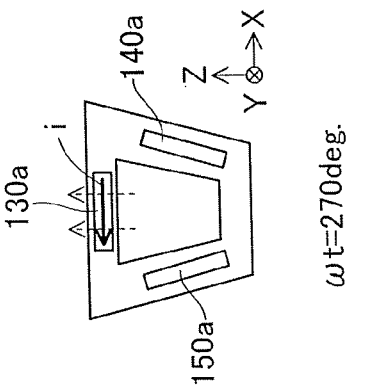
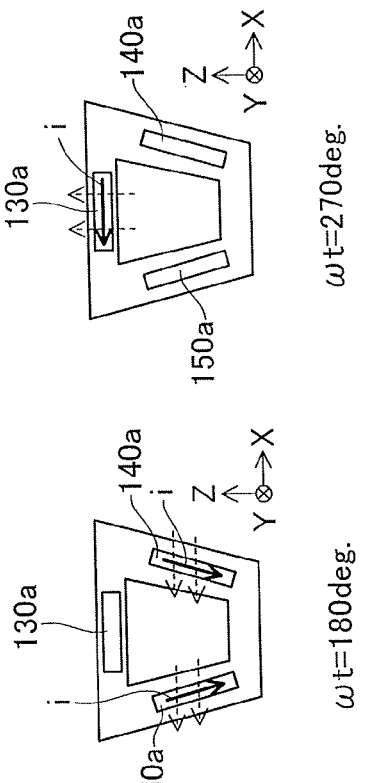
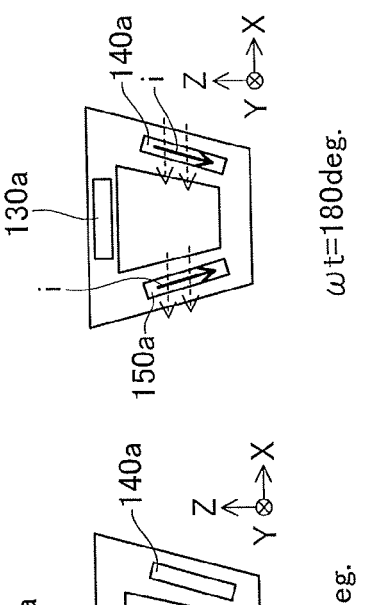
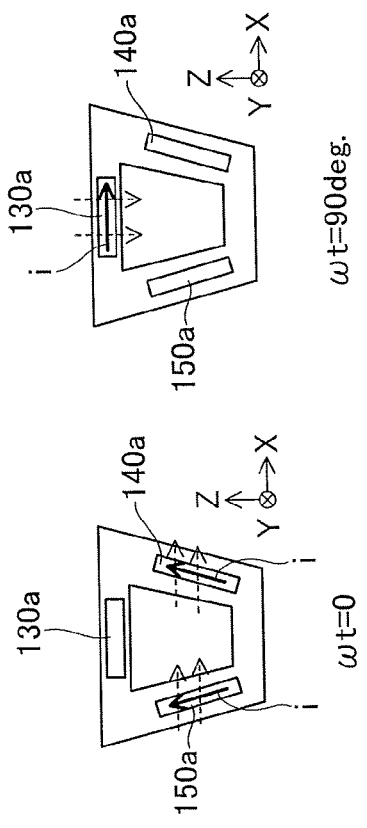

MICROWAVE ASSISTED MAGNETIC HEAD AND MAGNETIC DISK DEVICE

BACKGROUND OF THE INVENTION

1. Field of the Invention

The present invention relates to a microwave assisted thin film magnetic head that provides an assistance function to generate a circularly polarized magnetic field of a microwave band as an assistance method for writing data signals to a magnetic recording medium having a large coercive force to stabilize magnetization. The present invention also relates to a magnetic disk device using the microwave assisted thin film magnetic head.

2. Description of the Background Technology

Conventional magnetic recording media, such as hard disks, have undergone significant improvements in in-plane recording density through improvements such as miniaturization of magnetic particles and improvements in magnetic materials that configure magnetic recording layers, miniaturization of the head fabrication and the like. Furthermore, recent magnetic recording reproducing devices primarily use a perpendicular magnetic recording method that improves in-plane recording density by miniaturizing the recording bit by magnetizing the recording layer in a perpendicular direction to the surface of the magnetic recording medium. Further improvements in the in-plane recording density are expected in the future.

Meanwhile, because thermal fluctuation easily occurs in recording magnetization with miniaturization of the recording bit and magnetic particles, magnetic particles having a large anisotropic magnetic field Hk and a large coercive force Hc are preferred for use as material for the recording layer.

However, when magnetic particles with a large anisotropic magnetic field Hk are used as the material for the recording layer, the coercive force of the recording layer becomes a large value of 5 KOe or greater. Generally, a recording magnetic field of at least twice the coercive force is said to be required when performing saturation magnetic recording, which has been problematic for saturation magnetization of the recording layer with conventional magnetic head performance. In other words, the recording and erasing of data on a magnetic disk has been problematic.

In response to these technical problems, a novel recording method is proposed that uses microwave assistance. This method attempts to reduce the magnetization-inversed magnetic field in the perpendicular direction by forming a spin torque oscillator (STO) configured by multiple layers of magnetic thin film in the gap between the recording main pole of the perpendicular magnetic head and the rear end shield to induce magnetization precession movement by generating an in-plane microwave magnetic field by the self-oscillation of the STO. (U.S. Pat. No. 6,785,092)

Specifically, a field generation layer (FGL) of the STO configured from multiple layers of thin film self-oscillates at a high frequency, and the leakage magnetic field generated from the surface thereof is used as microwave assistance. The microwave assisted magnetic field generated here is known as a linearly polarized magnetic field. This assistance method is also known as a self-excited type.

Compared to this assistance method, a head device is proposed that arranges an auxiliary coil within a gap between the main pole and the rear end shield and that performs microwave assisted recording by generating a high frequency in-plane magnetic field within the gap by driving high frequency current to the auxiliary coil (Japanese Laid-Open Patent Application Publication No. 2007-299460). This assistance method is also known as an induced type. A magnetic head device that provides this type of assistance method can apply high frequency in-plane alternate-current magnetic fields in a microwave band to the recording layer of the recording medium. The effect of such assistance greatly reduces the perpendicular recording magnetic field. Therefore, the recording and erasing of data can be performed at a high-speed even with a recording layer having a large coercive force. Furthermore, the in-plane alternate-current magnetic fields generated by driving high frequency current to the auxiliary coil provide the following characteristics:

1) the frequency can be controlled on an order of ppm, and 2) the generated magnetic field is easily controlled by controlling the amplitude of the high frequency current.

The microwave assisted magnetic field generated by this method is also a linearly polarized magnetic field.

Meanwhile, analysis has advanced in recent years concerning the advantageous effects of recording properties through microwave assistance, and research has also been advancing around the effects of the intensity, polarization, frequency, and the like, of assistance magnetic fields. Furthermore, it has been found that use of a circularly polarized magnetic field is preferred for assistance, as a circularly polarized magnetic field can generate a stronger inversed magnetic field compared to a linearly polarized magnetic field (Y. Wang et. al, J. Appl. Phys. 105, 07B902 (2009)). From this perspective, the method disclosed in Japanese Laid-Open Patent Application Publication No. 2010-003353 proposes a method for generating a circularly polarized magnetic field in an induced type in which an STO is used. In other words, because a lamination layer plane 25a of a layered structure body 25 proposed in Japanese Laid-Open Patent Application Publication No. 2010-003353 is tilted relative to an air bearing surface (ABS) 61s, the high frequency magnetic field Hac from the spin torque oscillator 10 is used to act as a circularly polarized magnetic field in relation to the magnetic recording layer 81 of the magnetic recording medium 80.

However, the configuration of the proposed STO has problems, such as:

1) the process is extremely complicated in that the lamination of the magnetic thin film requires a minimum of five layers;

2) magnetic film having an extremely high magnetic anisotropy is required for STO oscillation;

3) control of the oscillation frequency is difficult as such control is performed only by the current density infused into the STO and as sudden changes can occur in the oscillation frequency as a result of very small fluctuations in the current density, and 4) the control parameters a microwave magnetic field that can be generated are not clear, and the size of the generated magnetic field is also not unapparent. Although a control parameter is assumed to be current density that infuses energy, the oscillation frequency changes when adjusting current density. As a result, arbitrarily controlling both parameters is difficult.

In addition to these problems, forming the element at an incline within the gap as in the proposed configuration is extremely difficult from a process perspective which makes oscillation control even more difficult.

The present invention is conceived based on these actual circumstances and has an object to provide a specific head structure and current drive method that generates a circularly polarized magnetic field with high magnetization inversion efficiency in an induced method for microwave assistance, or in other words, that generates a circularly polarized magnetic field in an induced method for microwave assistance, which has characteristics, such as, 1) that frequency can be controlled on an order of ppm, and 2) that a generated magnetic field can easily be controlled by controlling the amplitude of high frequency current.

SUMMARY

In order to solve the above drawbacks, a microwave assisted magnetic head of the present invention is configured to include: a writing main pole; a writing coil that generates a writing magnetic field at the writing magnetic field part; at least two or more auxiliary coils that are arranged in a periphery of the writing main pole; and microwave current supply means that applies microwave currents to the at least two or more auxiliary coils. The at least two or more auxiliary coils respectively include linear body parts linearly arranged on an air bearing surface (ABS) side, two of the linear body parts of the at least two or more auxiliary coils are arranged in a substantially orthogonal positional relationship, and the microwave current supply means is configured such that the microwave current supply means changes a phase difference of the microwave currents applied respectively to the at least two or more auxiliary coils.

Further, in a preferred embodiment of the present invention, a microwave assisted magnetic head is configured to include a writing main pole; an auxiliary pole; a writing coil that generates a writing magnetic field at the writing main pole; a first auxiliary coil and a second auxiliary coil that are arranged between the writing main pole and the auxiliary pole; microwave current supply means that applies microwave currents to the first auxiliary coil and the second auxiliary coil. The first auxiliary coil includes a first linear body part linearly arranged on an air bearing surface side (ABS), the second auxiliary coil includes a second linear body part linearly arranged on the ABS side, and the first linear body part and the second linear body part are orthogonally arranged in a crossed shape in a separated state, and the microwave current supply means is configured such that the microwave current supply means changes a phase difference of the microwave currents applied respectively to the first auxiliary coil and the second auxiliary coil.

Further, in a preferred embodiment of the present invention, the microwave assisted magnetic head is configured such that the phase difference of the microwave currents applied respectively to the first auxiliary coil and the second auxiliary coil are configured at 90 degrees.

Further, in a preferred embodiment of the present invention, the microwave assisted magnetic head is configured such that a circularly polarized magnetic field is generated as an assistance magnetic field by the microwave currents applied respectively to the first auxiliary coil and the second auxiliary coil.

Further, in a preferred embodiment of the present invention, a microwave assisted magnetic head is configured to include: a writing main pole; a shield (auxiliary) pole that is formed so as to surround the writing main pole and that includes a trailing side shield part, a first side shield part and a second side shield part; a writing coil that generates a writing magnetic field at the writing main pole; a first auxiliary coil that is arranged between the writing main pole and the trailing side shield part; a second auxiliary coil that is arranged between the writing main pole and the first side shield part; a third auxiliary coil that is arranged between the writing main pole and the second side shield part; and microwave current supply means that applies microwave currents to the first auxiliary coil, the second auxiliary coil and the third auxiliary coil. The first auxiliary coil includes a first linear body part linearly arranged on an air bearing surface (ABS) side, the second auxiliary coil includes a second linear body part linearly arranged on the ABS side, the third auxiliary coil includes a third linear body part linearly arranged on the ABS side, the second linear body part and the third linear body part are each arranged to have a substantially orthogonal positional relationship relative to the first linear body part, and the microwave current supply means is configured such that the microwave current supply means changes phase differences of the microwave currents applied respectively to the first auxiliary coil, the second auxiliary coil and the third auxiliary coil.

Further, in a preferred embodiment of the present invention, the microwave assisted magnetic head is configured such that the phase difference of the microwave currents applied respectively to the second auxiliary coil and the third auxiliary coil are configured at 90 degrees relative to the first auxiliary coil.

Further, in a preferred embodiment of the present invention, the microwave assisted magnetic head is configured such that a circularly polarized magnetic field is generated as an assistance magnetic field by the microwave currents applied respectively to the first auxiliary coil, the second auxiliary coil, and the third auxiliary coil.

A head gimbal assembly of the present invention is configured to include a slider that includes the microwave assisted magnetic head according to claim 1 and that is arranged opposing the recording medium; and a suspension that flexibly supports the slider.

A magnetic disk device is configured to include: a slider that includes the microwave assisted magnetic head according to claim 1 and that is arranged opposing the recording medium; and a positioning device that determines a position relative to the recording medium while supporting the slider.

BRIEF DESCRIPTION OF THE DRAWINGS

FIG. 10 is a plan view of the writing main pole and the periphery thereof from the ABS side.

FIGS. 14A, 14B, 14C, and 14D are respective diagrams for explaining a sequence of a state in which a circularly polarized magnetic field is generated, and are views of the first auxiliary coil, the second auxiliary coil, and the third auxiliary coil from the ABS side.

DETAILED DESCRIPTION OF EMBODIMENTS

Hereafter, preferred embodiments to execute the present invention will be explained in detail referring to the attached drawings. In each drawing, elements which are configured the same are indicated with the same reference numbers.

Dimensions of configuring elements and positional relationships between the configuring elements are not always illustrated precisely but illustrated arbitrarily to make the drawings more easily understood.

Figure 3:
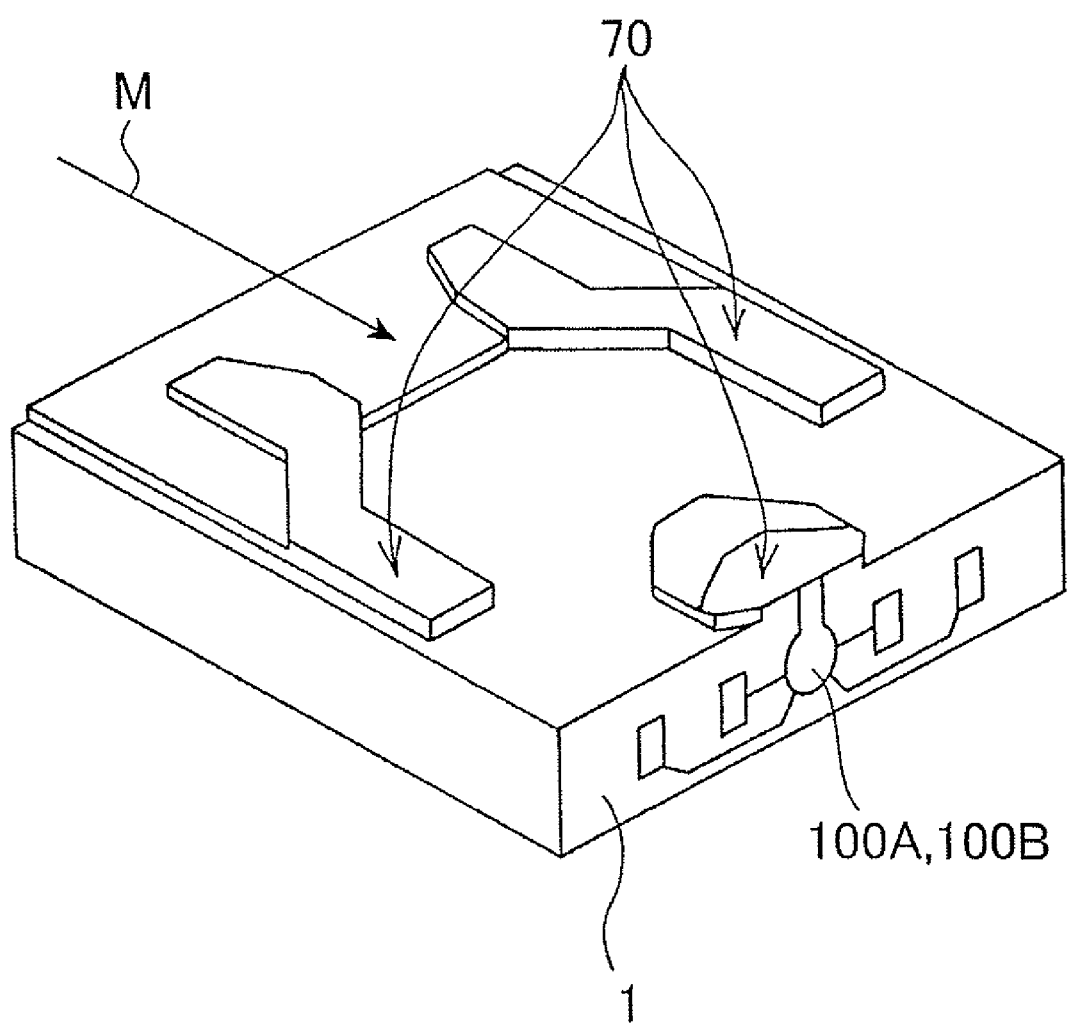
FIG. 3 is a perspective view diagrammatically illustrating the overall structure of a magnetic head.

An X-direction illustrated in FIG. 3 and thereafter corresponds to a track width direction, and a size in the X-direction may be referred to as "a width." A Y-direction illustrated in the drawings corresponds to a depth direction of an element. A side that is close to an ABS (a surface of a thin magnetic head facing a recording medium) in the Y-direction shown in FIG. 3 and thereafter may be referred to as "front-side," and an opposite side with respect to the front-side may be referred to as "rearward (depth side)."

A Z-direction illustrated in FIG. 3 and thereafter corresponds to a direction where lamination films are layered to configure the element, which is a so-called thickness direction. The direction in which the lamination films are layered may be referred to as "upward" or "upper side," and an opposite direction may be referred to as "downward" or "down side."

Figure 1:
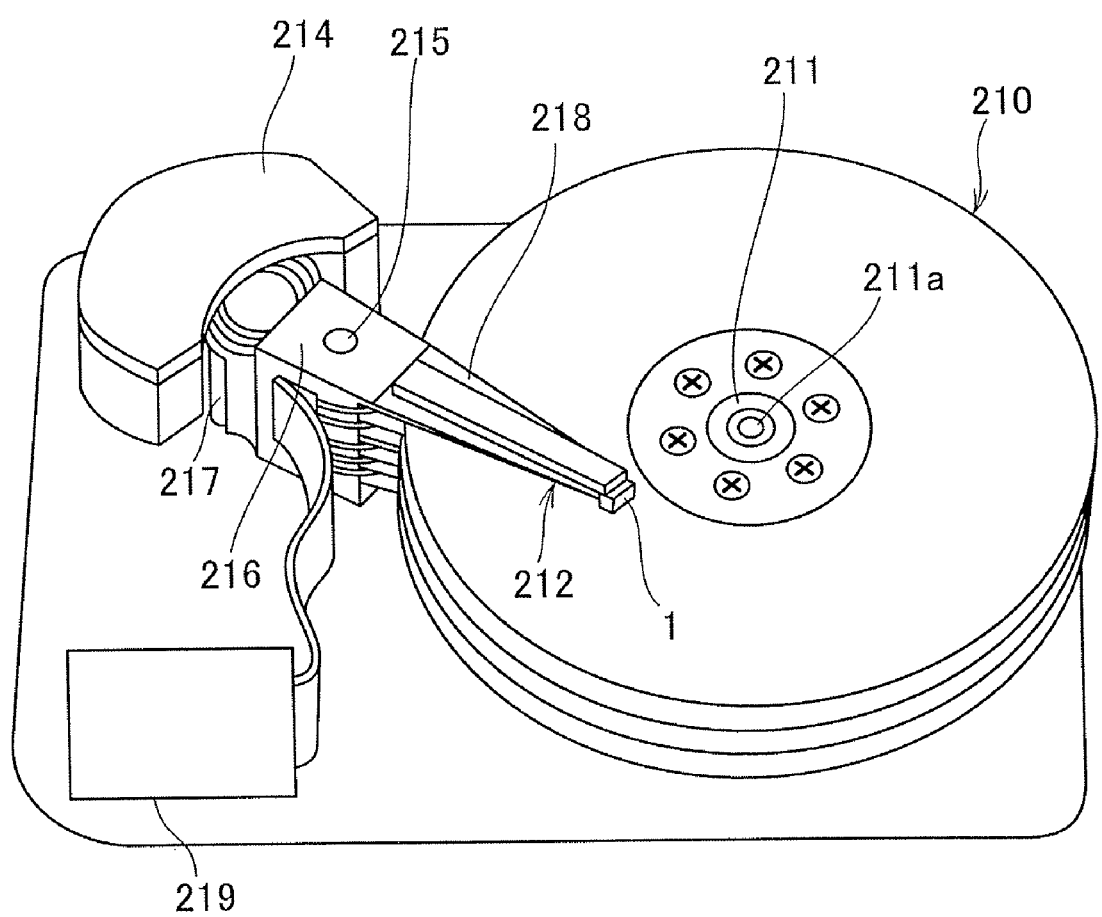
FIG. 1 is a perspective view that schematically illustrates a configuration of main part in one embodiment of a magnetic disk device (HDD: synonymous with magnetic recording and reproducing device) according to the present invention.
Figure 2:
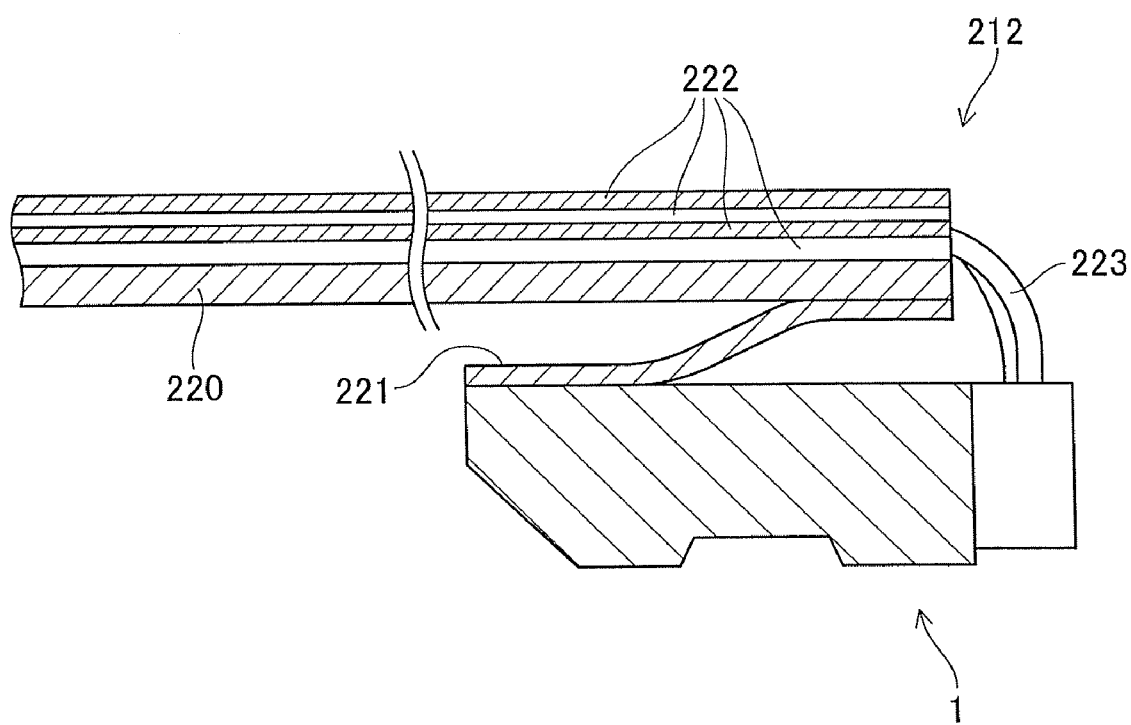
FIG. 2 is a cross sectional view of a part of a head gimbal assembly (HGA) in the magnetic disk device of FIG. 1.

FIG. 1 is a perspective view that schematically illustrates a configuration of main part in one embodiment of the magnetic disk device (HDD) (synonymous with magnetic recording reproducing device) according to the present invention. FIG. 2 is a cross sectional view illustrating a part of the tip end of the head gimbal assembly (HGA) in the magnetic disk device shown in FIG. 1.

The magnetic disk device is illustrated in FIG. 1. Notation 210 indicates a plurality of magnetic disks that are rotated around a rotational shaft 211a by a spindle motor 211. Notation 212 indicates an HGA for suitably opposing a slider base substrate 1 that includes a thin film magnetic head structure for writing and reading data signals to and from magnetic disks 210, to the surface of each magnetic disk 210. Notation 214 indicates an assembly carriage device for positioning the slider base substrate 1 that includes the thin film magnetic head structure on a track of the magnetic disk 210.

The assembly carriage device 214 is mainly configured of a carriage 216 that can angularly swing about a pivot bearing shaft 215, and a voice coil motor (VCM) 217, for example, that drives the carriage 216 to perform the angular swing.

A base part of a plurality of drive arms 218 that are stacked in the direction of the pivot bearing shaft 215 is attached to the carriage 216. The HGA 212 is attached to the tip end part of each of the drive arms 218. Furthermore, a single magnetic disk 210, a single drive arm 218, and a single HGA 212 may be provided in the magnetic disk device.

The magnetic disk 210 is grounded via the spindle motor 211 and the rotational shaft 211a thereof.

In FIG. 1, notation 219 is a control circuit for controlling the writing and reading operations of the thin film magnetic head provided on the slider base substrate 1. A drive source and a 90-degree phase shifter may also be assembled herein for assistance high frequency current applied to the auxiliary coil used in the present invention. In addition, a control system may also be assembled to enable current control or phase control. However, the assembly location of these devices is not particularly restricted to within the control circuit 219. The location for installation may be appropriately selected according to the design specification.

As illustrated in FIG. 2, the HGA 212 includes a slider base substrate 1, a load beam 220 and flexure 221 made of a metallic conductive material for supporting the slider base substrate 1, and a variety of wiring members 222 that include wiring members for applying the assistance high frequency current. The variety of the wiring members 222 in the embodiment illustrated in FIG. 2 are connected to terminal electrodes through wire bonding that use wire 223.

Moreover, a head element wiring member is also installed in the HGA 212 for transmitting writing signals that are applied to the writing head element of the thin film magnetic head formed on the slider base substrate 1 and for retrieving reading output voltages by applying constant current to the reading head element.

The slider base substrate 1 is attached to one end of the flexure 221 that has flexibility. A suspension for supporting the slider base substrate 1 is configured by the load beam 220 that is attached to the other end of the flexure 221.

(Description of Structure of Microwave Assisted Magnetic Head of Present Invention)

The microwave assisted magnetic head of the present invention is characterized by having a structure in which, as a main part of the invention, at least two or more auxiliary coils are arranged in the periphery of a writing main pole which is the tip end part of a main pole film, and in which a circularly polarized magnetic field is generated as an assistance magnetic field by microwave current applied respectively to the two or more auxiliary coils. Of course, the magnetic head also includes the writing main pole, a writing coil for generating the writing magnetic field to the writing main pole, and the like, which are the fundamental structural members.

Hereinafter, in order to provide easily understandable description of the configuration of the microwave assisted magnetic head (maybe abbreviated hereinafter as simply "magnetic head") of the present invention, descriptions will be provided separately to explain the general structural members that form the basis of a magnetic head, and to explain the configuration of the main part of the present invention.

<Description of General Structural Members that Form Basis of Magnetic Head>

First, with reference to FIGS. 3-7, the configuration of the general structural members that form the basis of a magnetic head is described. It is noted that descriptions of the structure of the main part of the present invention that have minute linear body structures are omitted due to restrictions in the size of the paper.

Figure 4:
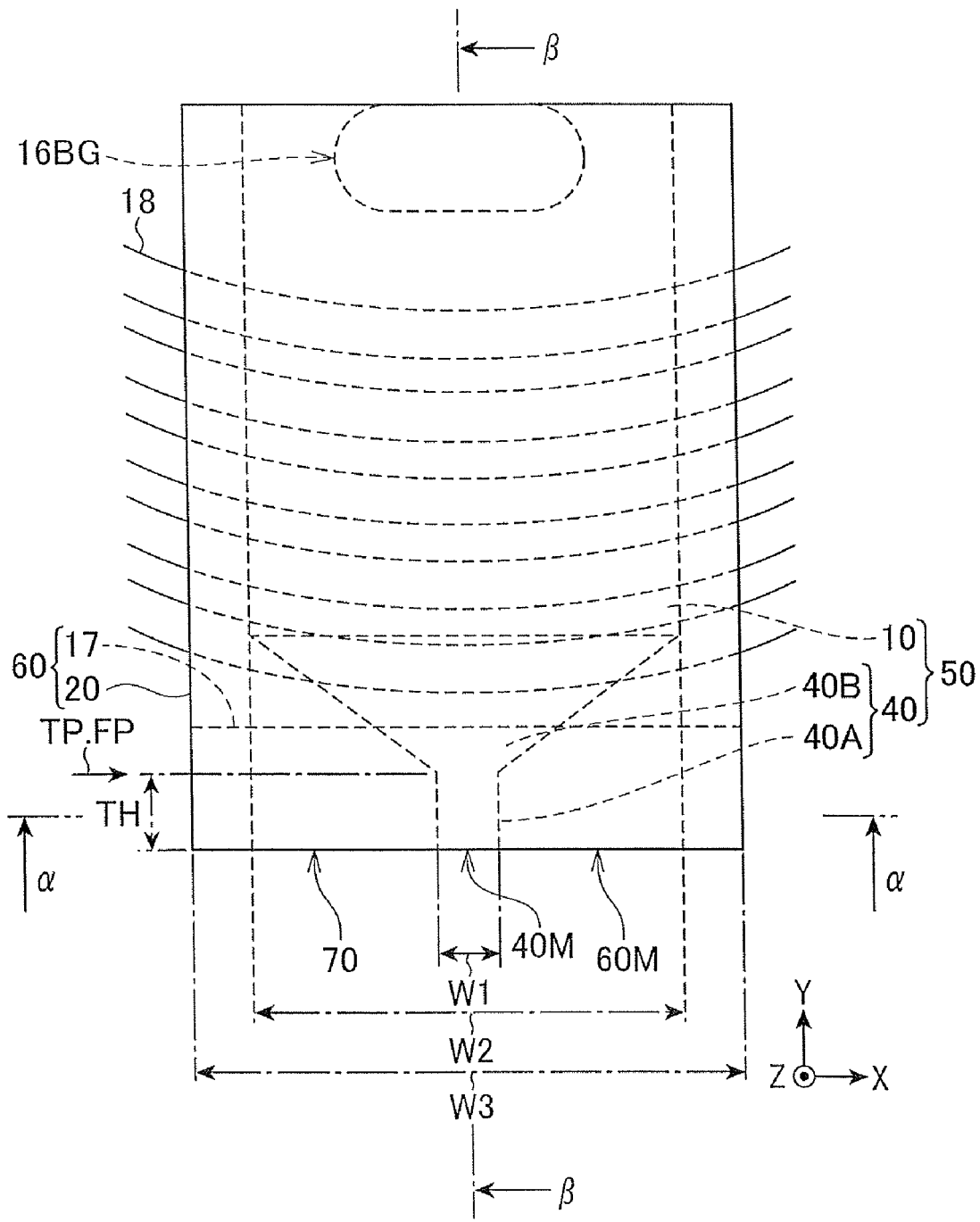
FIG. 4 is a plan view (lamination direction) of a recording head part of the magnetic head.
Figure 5:
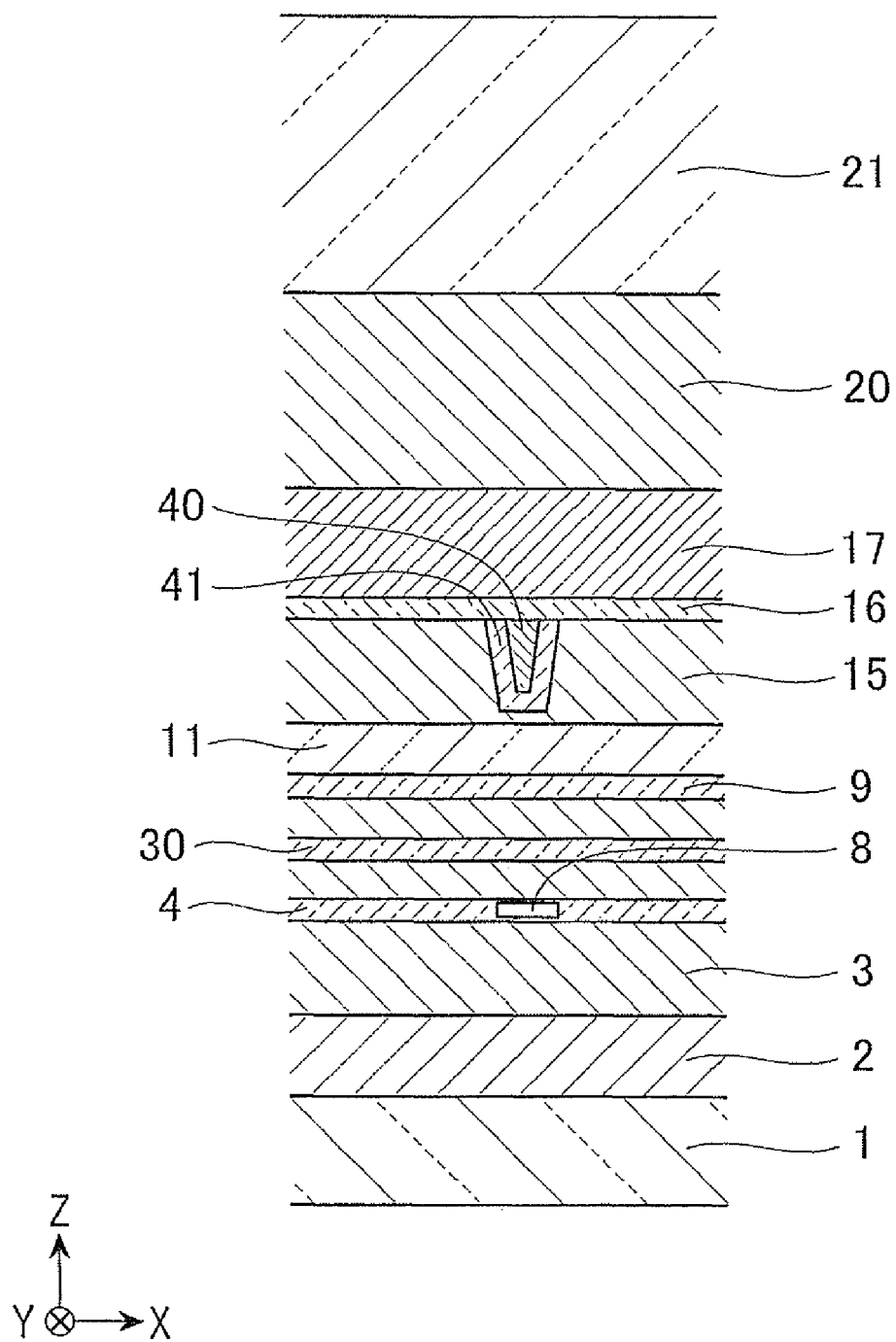
FIG. 5 is a cross sectional view in the direction of the line indicated by arrow α shown in FIG. 4.
Figure 6:
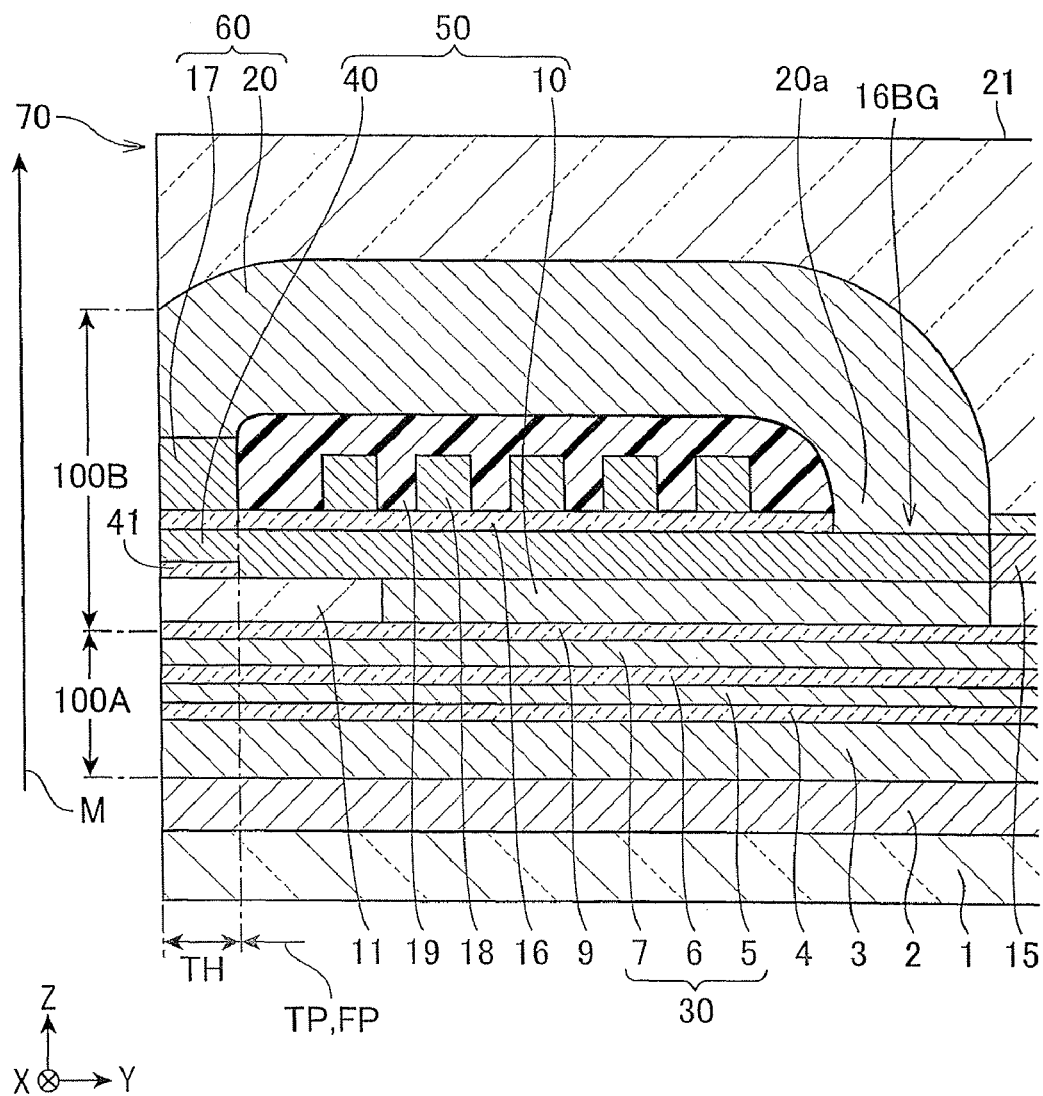
FIG. 6 is a cross sectional view in the direction of the line indicated by arrow β shown in FIG. 4.

FIG. 3 is a perspective view schematically illustrating the overall structure of a magnetic head. FIG. 4 is a plan view of a recording head part of a magnetic head. FIG. 5 is a cross sectional view in the direction of the line indicated by arrow α shown in FIG. 4. FIG. 6 is a cross sectional view in the direction of the line indicated by arrow β shown in FIG. 4.

The magnetic head, as illustrated in FIG. 3, includes a slider base substrate 1 in an approximately rectangular structure. The slider base substrate 1 includes an air bearing surface (ABS) 70 that is directly involved in the flying characteristics and a recording head part 100B and a reproducing head part 100A at a side end surface of the slider base substrate 1 that exists at the air outflow side (trailing edge side) relative to the airflow direction M (same as the substantive linear movement direction of the disk shaped magnetic recording medium).

The details of the recording head part 100B and the reproducing head part 100A are illustrated in FIGS. 4-6.

The magnetic head illustrated in FIGS. 3-6 is configured as a composite type head capable of performing both recording and reproducing of data. The magnetic head is configured on the slider base substrate 1 in the following lamination order: an insulating film 2, the reproducing head part 100A utilizing a magnetoresistive effect (MR), a separation film 9, the recording head part 100B that carries out a recording process with a perpendicular recording system, and a nonmagnetic film 21 as an overcoat film.

(Description of the Reproducing Head Part 100A)

The reproducing head part 100A is configured by laminating in order, for example, a lower lead shield film 3, a shield gap film 4, and an upper lead shield film 30. A reproducing head element (MR element 8) is embedded in the shield gap film 4 so as to be exposed to the ABS 70 (see FIG. 5).

The lower lead shield film 3 and the upper lead shield film 30 magnetically separate the MR element 8 from the surroundings and is configured to extend in the rearward direction from the ABS 70. The lower lead shield film 3 is configured, for example, from a magnetic material, such as nickel iron alloy (NiFe). The upper lead shield film 30 is configured, for example, by laminating two upper lead shield film portions 5 and 7 which sandwich a nonmagnetic film 6 therebetween. The upper lead shield film portions 5 and 7 are configured, for example, from a magnetic material, such as nickel iron alloy (NiFe). The nonmagnetic film 6 is configured, for example, from a nonmagnetic material, such as ruthenium (Ru) or alumina. In addition, the upper lead shield film 30 is not limited to a three layer structure as described above, but may include a structure made from a single layer configured, for example, from a magnetic material, such as nickel iron alloy (NiFe).

The shield gap film 4 electrically separates the MR element 8 from the surroundings and is configured, for example, from a nonmagnetic insulating material, such as alumina. The MR element 8 is configured from an element, such as a giant magnetoresistive effect (GMR) element, a tunneling magnetoresistive effect (TMR) element, or the like.

(Description of the Recording Head Part 100B)

The recording head part 100B includes a nonmagnetic film 11, a pole film 50, a magnetic gap film 16 provided with a magnetic coupling opening part (backgap 16BG), a coil film 18 embedded within the insulating film 19, a magnetic film 60, a first write shield film 15, and a second write shield film 17.

The nonmagnetic film 11 electrically and magnetically separates an auxiliary pole film 10 from the surroundings and is configured, for example, from a nonmagnetic material, such as alumina.

The pole film 50 extends in the rearward direction from the ABS 70 and includes the auxiliary pole film 10 and a main pole film 40. Depending on the design specification, the auxiliary pole film 10 and the main pole film 40 can be arranged vertically inverted (Z direction). In addition, the coupling magnetic layer formed on the magnetic coupling opening part (backgap 16BG) may also be referred to as a coupling yoke 20a.

The auxiliary pole film 10 extends from a position away from the ABS 70 to the backgap 16BG. The auxiliary pole film 10 is arranged, for example, at the leading side relative to the main pole film 40 and includes, as illustrated in FIG. 4, a rectangular planar shape (width W2). The auxiliary pole film 10 may be arranged to the trailing side of the main pole film 40 as described above. In addition, the auxiliary coils 110, 120 and the like, which are the main structures of the present invention having the below-described minute linear body structure, are provided between the main pole film 40 and the write shield film 17.

The main pole film 40 extends from the ABS 70 to the backgap 16BG. The main pole film 40 includes, for example, as illustrated in FIG. 4, a narrow width writing main pole 40A that extends rearward from the ABS 70, and a wide width body part 40B that tapers from the rear side of the writing main pole 40A.

The writing main pole 40A is the substantive emitting part of the magnetic flux (so-called pole film) and has a constant width W1 that regulates the recording track width. The body part 40B is a part that supplies the magnetic flux to the writing main pole 40A and has a width W2 that is larger than the width W1. The width of the body part 40B narrows gradually towards the writing main pole 40A. The position at which the width of the main pole film 40 begins to widen from the width W1 to the width W2 is called a flare point FP.

The main pole film 40 is in an inverse trapezoidal shape in which the end surface 40M on the side closer to the ABS 70 makes the long edge positioned on the trailing side to be a top and the short edge positioned on the leading side to be a bottom, respectively. The top end edge of the trapezoidal shape is the substantive recording location.

The magnetic gap film 16 is a gap for magnetically separating the pole film 50 and the magnetic film 60 and is configured, for example, from a nonmagnetic insulating material, such as alumina or the like, or a nonmagnetic conductive material, such as ruthenium or the like.

The recording coil film 18 generates a magnetic flux for magnetic recording onto the medium and is configured, for example, from a highly conductive material, such as copper (Cu) or the like. The recording coil film 18, as illustrated in FIG. 4, includes a spiral structure that is wound centrally around the backgap 16BG (coupling yoke 20a).

The insulating film 19 electrically separates the recording coil film 18 from the surroundings and is configured, for example, from a nonmagnetic insulating material, such as a photoresist, a spin-on-glass (SOG) or the like that exhibit flow properties when applying heat. The frontmost end position of the insulating film 19 is the throat-height-zero position TP. The distance between the throat-height-zero position TP and the ABS 70 is referred to as a throat height TH. FIG. 4 illustrates a case in which the throat-height-zero position TP matches the flare point FP.

The magnetic film 60 makes the gradient of the perpendicular magnetic field steep by capturing the components spreading out from the magnetic flux emitted from the pole film 50, while at the same time, circulating the magnetic flux between the recording head 100B and the recording medium by capturing the magnetic flux that returns from the recording medium. As the magnetic film 60 extends rearward from the ABS 70 on the trailing side of the pole film 50, the magnetic film 60 is isolated from the pole film 50 by the magnetic gap film 16 at the front side thereof and is coupled to the pole film 50 through the backgap 16BG in the rear side. The end surface 60M of the magnetic film 60 on the side near the ABS 70 is, for example, in a rectangular shape with a width W3 that is larger than the width W1 as illustrated in FIG. 4. The magnetic film 60 includes, for example, a second write shield film 17 and a return yoke film 20 being made up of mutually separate bodies.

The first and second write shield films 15 and 17 mainly provide a function for increasing the perpendicular magnetic field gradient and are configured, for example, from a magnetic material having a high saturation magnetic flux density, such as nickel iron alloy, ferroalloy or the like. The first and second write shield films 15 and 17 configure a so-called wrap-around structure. In addition, these films, including the magnetic film 20, are referred to as trailing shields.

In the wrap-around structure illustrated in FIG. 5, the first write shield film 15 is adjunct, via the magnetic gap film 41, to both side surfaces of the ABS side of the writing main pole 40A that configures the main pole film 40. Accordingly, a side shield film is formed on both sides of the writing main pole 40A by the write shield film 15.

Further, the second write shield film 17 is adjunct, via the magnetic gap film 16, to the top surface of the ABS side of the writing main pole 40A. The second write shield film 17 is also called a pedestal yoke, and the magnetic gap film 16 sandwiched between the second write shield film 17 and the top surface of the writing main pole 40A forms the writing gap.

The first and second write shield films 15 and 17 capture the spreading components of the magnetic flux emitted from the pole film 50 as a result of the arrangement described above to increase the magnetic field gradient of the perpendicular magnetic field and to narrow the recording width.

The second write shield film 17 extends in the rearward direction from the ABS 70 while being adjunct to the magnetic gap film 16, and is adjunct to the insulating film 19 at the rear end thereof. In this manner, the write shield film 17 performs the role of regulating the frontmost position (throat-height-zero position TP) of the insulating film 19.

The return yoke film 20 performs the function of circulating the magnetic flux and is configured, for example, from the magnetic material similar to that for the write shield film 17. As illustrated in FIG. 6, at the trailing side of the write shield film 17, the return yoke film 20 extends from the ABS 70 to the backgap 16BG via on the insulating film 19. The return yoke film 20 is coupled to the write shield film 17 in the front part thereof and to the pole film 50 through the back gap 16BG in the rear part thereof.

The nonmagnetic film 21 protects the magnetic head and is configured, for example, from a nonmagnetic insulating material, such as alumina or the like.

Figure 7:
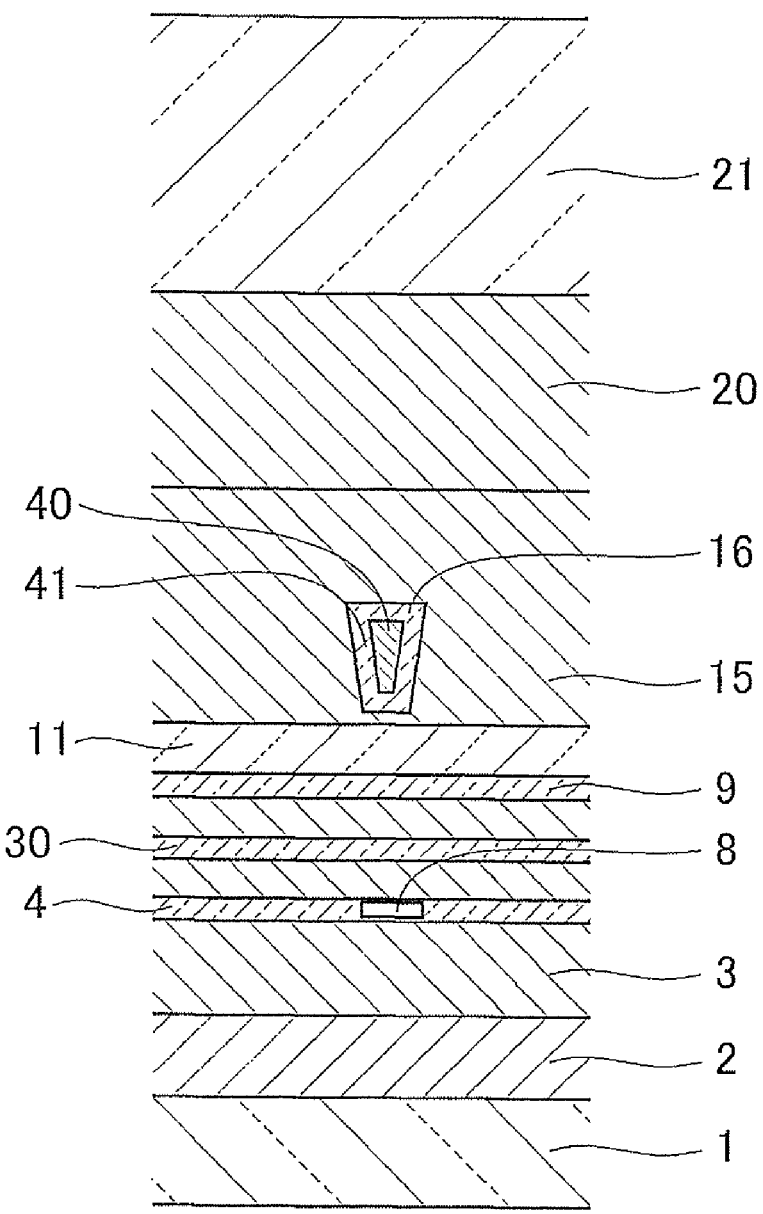
FIG. 7 illustrates another embodiment of a wrap-around structure.

FIG. 7 illustrates another embodiment of the wrap-around structure. In this embodiment, the periphery of the writing main pole 40A is completely surrounded by the magnetic gap film 41 and the upper magnetic gap film 16 that are formed continuously, and a write shield film 15 that corresponds to the first and second write shields (15 and 17) is arranged in the periphery thereof. In other words, this embodiment provides a structure in which the writing main pole 40A is embedded inside the write shield film 15. The shield films positioned on both sides of the writing main pole 40A function as side shield films, and the shield film positioned on the upper side functions as the second write shield film illustrated in FIGS. 3 to 6.

In addition, this wrap-around structure is not limited to the above-described configuration. Various configurations can be adopted. Furthermore, as understood from the explanation provided below, application of the configuration of the main part of the present invention is not limited only to the head including the wrap-around structure.

<Description of Configuration of Main Part of Present Invention>

The main part of the present invention is characterized by including a structure in which at least two auxiliary coils are arranged in the periphery of a writing main pole which is the tip end part of a main pole film, and in which a circularly polarized magnetic field is generated as an assistance magnetic field by applying microwave currents respectively to the two or more auxiliary coils with phase differences of the microwave currents taken into account. In addition, the circularly polarized magnetic field described in the present invention can be broadly interpreted within the bounds to achieve the effect of the present invention, and is a concept that also includes an elliptically polarized magnetic field (for example, a ratio of the long axis to short axis is within three).

Descriptions will be given below of two embodiments: 1) a case in which two auxiliary coils are used and are arranged in a recording gap, and 2) a case in which three auxiliary coils are used and are arranged in the periphery of the writing main pole.

First Embodiment

First, an embodiment in which two auxiliary coils are used and are arranged in so-called recording gap spaces is described with reference to FIGS. 8 to 9.

Figure 8:
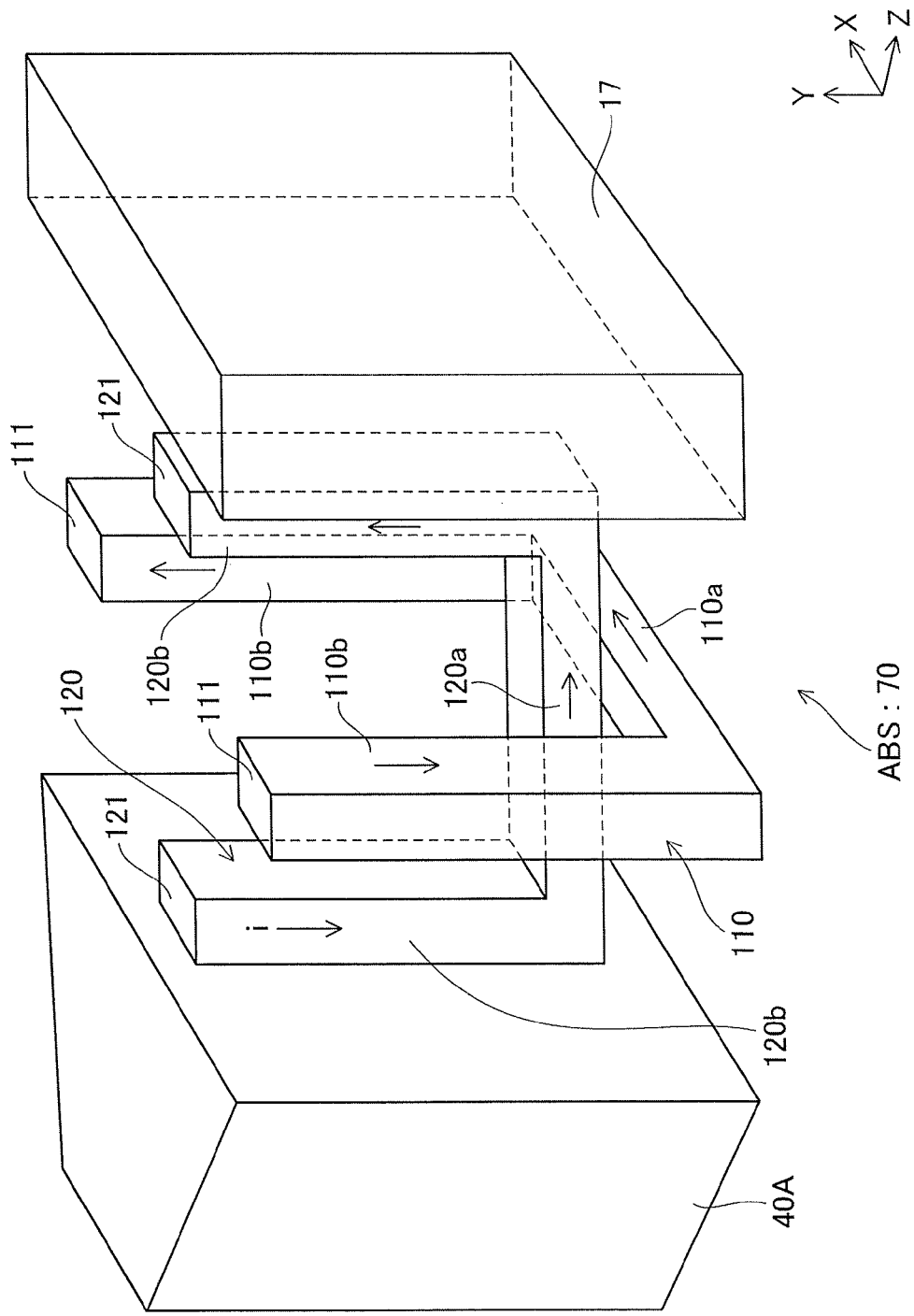
FIG. 8 is a schematic perspective view diagrammatically illustrating a state in which a first auxiliary coil and a second auxiliary coil are inserted and arranged between a writing main pole and the auxiliary pole that is a write shield film (the space where a so-called magnetic gap film is formed).

FIG. 8 is a schematic perspective view diagrammatically illustrating a state in which a first auxiliary coil 110 and a second auxiliary coil 120 are inserted and arranged between the writing pole part (main pole) 40A and the auxiliary pole 17 that is the write shield film (the space where the so-called magnetic gap film is formed). The bottom side of the drawing corresponds to the ABS 70. FIGS. 9A, 9B, 9C, and 9D are diagrams that view the first auxiliary coil 110 and the second auxiliary coil 120 from the ABS side. In addition, the shape of the member referred to as an auxiliary coil within the present invention is not required to be in a ring shape but may also be approximately in a U shape. This structure can be easily understood by understanding the configuration of the main part of the present invention as described hereinafter.

As illustrated in FIG. 8, the first auxiliary coil 110 includes a first linear body part 110*a* that is linearly arranged along the ABS, and first linear main bodies 110*b*, 110*b* that extend in the Y direction (interior side (rearward)) from both end parts of the first linear body part 110*a*. In the drawing, although the first main bodies 110*b*, 110*b* are depicted only to the end surface indicated by notation 111 due to the limitation of the sheet size, in actuality the first main bodies 110*b*, 110*b* are not cut off at this location. However, the first main bodies 110*b*, 110*b* extend further in the Y direction and are connected to a microwave current supply means.

The second auxiliary coil 120 includes a second linear body part 120*a* that is linearly arranged along the ABS, and second linear main bodies 120*b*, 120*b* that extend in the Y direction (interior side (rearward)) from both end parts of the second linear body part 120*a*. In the drawing, although the second linear main bodies 120*b*, 120*b* are depicted only to the end surface indicated by notation 121 due to with the restriction of the sheet size, in actuality the second linear main bodies 120*b*, 120*b* are not cut off at this location. However, the second linear main bodies 120*b*, 120*b* extend further in the Y direction and are connected to a microwave current supply means.

As illustrated in FIGS. 8 and 9, the first linear body part 110a of the first auxiliary coil 110 and the second linear body part 120a of the second auxiliary coil 120 in the present invention are orthogonally arranged in a crossing shape in a separated state. The area in which the first auxiliary coil 110 and the second auxiliary coil 120 illustrated in FIG. 8 exist is where the so-called recording gap is formed, which is filled in with a nonmagnetic material, in the so-called normal magnetic head. With the present invention as well, although not illustrated in the drawing, the peripheries around the first auxiliary coil 110 and the second auxiliary coil 120 are also filled in with a nonmagnetic material.

The wire diameter (thickness) of the first auxiliary coil 110 and the second auxiliary coil 120 is, for example, about 5 nm, and the length of the first linear main body part 110a and the second linear main body part 120a is about 20 nm. With such dimensional specification, the first linear body part 110a and the second linear body part 120a can be arranged with 5 nm spaces provided on both sides there of even if, for example, the recording gap space is about 30 nm.

Figure 15:
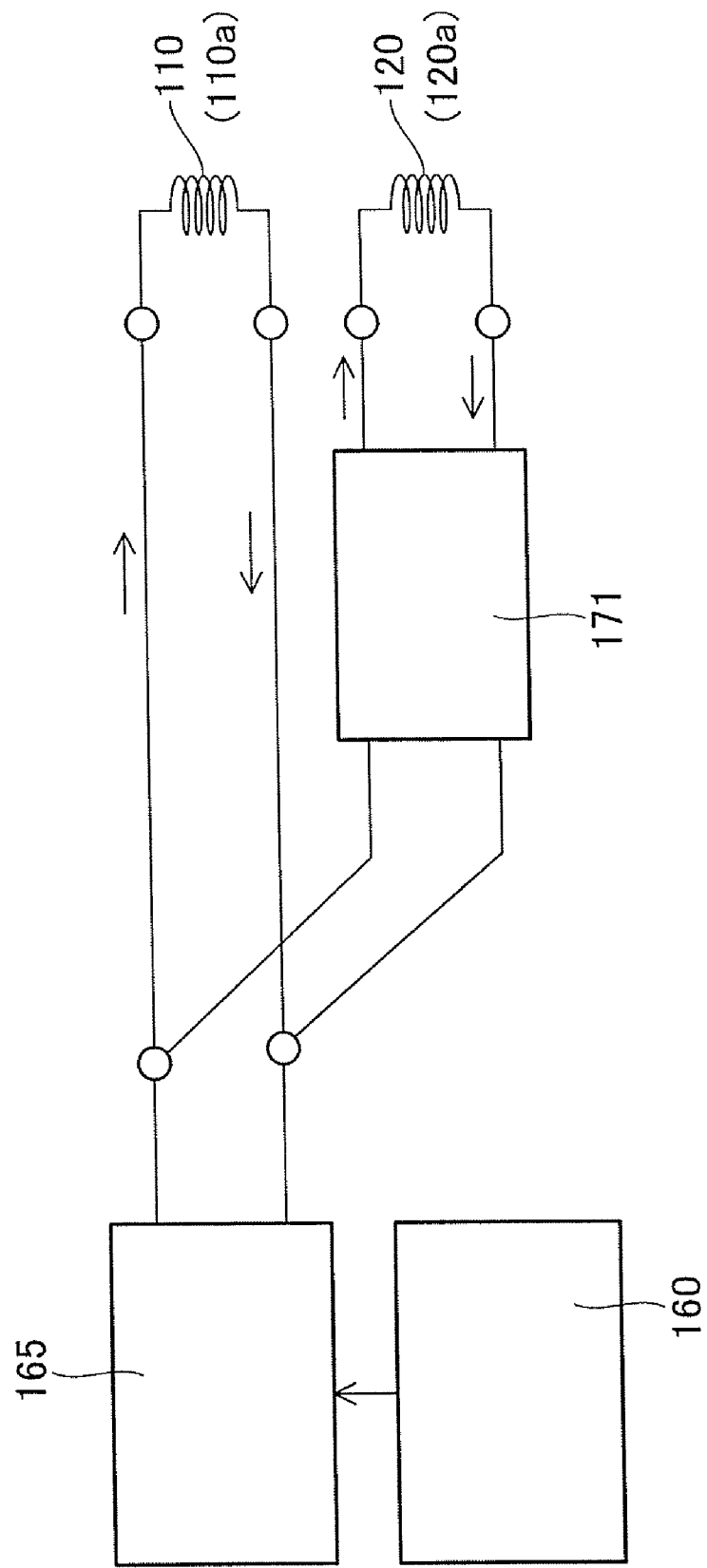
FIG. 15 is a schematic circuit diagram of a configuration in which a phase difference in microwave currents applied respectively to the first auxiliary coil and the second auxiliary coil is 90 degrees.

As described above, the microwave current supply means for applying microwave currents (high frequency current) is connected to each of the first auxiliary coil 110 and the second auxiliary coil 120. The microwave current supply means has, for example, a phase shifter interposed at a middle step in the connection so that a phase difference between the microwave currents applied respectively to the first auxiliary coil 110 and the second auxiliary coil 120 can be changed. In the present invention, a configuration is provided so that the circularly polarized magnetic field is generated as an assistance magnetic field from the ABS 70 by the microwave currents applied respectively to the first auxiliary coil 110 and the second auxiliary coil 120. Therefore, the microwave currents respectively applied to the first auxiliary coil 110 and the second auxiliary coil 120 are configured so that phase difference of 90 degrees is produced. The phase difference may be either positive or negative. For example, as illustrated in the schematic circuit diagram in FIG. 15, a high frequency current drive source 165 is provided as a structural element of the microwave current supply means. The current drive or the like by the high frequency current drive source 165 is controlled based on, for example, control signals from a hard disk drive (HDD) controller 160. In addition, although the microwave current (high frequency current) is respectively applied from the high frequency current drive source 165 to the first auxiliary coil 110 and the second auxiliary coil 120, a 90 degree phase shifter 171 is preferably interposed in one of wire circuits (for example, on the second auxiliary coil 120 side as illustrated in the drawing) to change the phase difference by 90 degrees. In order to ensure the phase difference, the wiring is preferably provided to configure branch circuits from the same power source as illustrated in FIG. 15. Moreover, the microwave current supply means in the present invention conceptually includes the means to change the phase difference (for example, the 90 degree phase shifter).

The frequency of the applied microwave current is an ultra high frequency (5 GHz to 40 GHz) of a microwave band that corresponds to a ferromagnetic resonant frequency of the magnetic microparticles that configure the magnetic recording layer of the magnetic recording medium.

Accordingly, the state in which the circularly polarized magnetic field is generated as an assistance magnetic field by making phase differences of the microwave currents (high frequency current) applied from the high frequency current drive source 165 respectively to the first auxiliary coil 110 and the second auxiliary coil 120 to be 90 degrees is descried with reference to FIG. 9A, FIG. 9B, FIG. 9C and FIG. 9D.

FIG. 9A, FIG. 9B, FIG. 9C and FIG. 9D are diagrams that view the first auxiliary coil 110 and the second auxiliary coil 120 from the ABS 70 side. The first linear body part 110a of the first auxiliary coil 110 and the second linear body part 120a of the second auxiliary coil 120 is in a crossed formation in the shape of a cross.

In these drawings, the phase of the second auxiliary coil 120 is greater than the phase of the first auxiliary coil 110 by 90 degrees. In other words, when a waveform that takes into account the phase the high frequency current applied to the second auxiliary coil 120 is $\sin(\omega t + 90)$, the waveform that takes into account the phase of the high frequency current applied to the first auxiliary coil 110 is expressed as $\sin(\omega t)$.

Figure 9A:
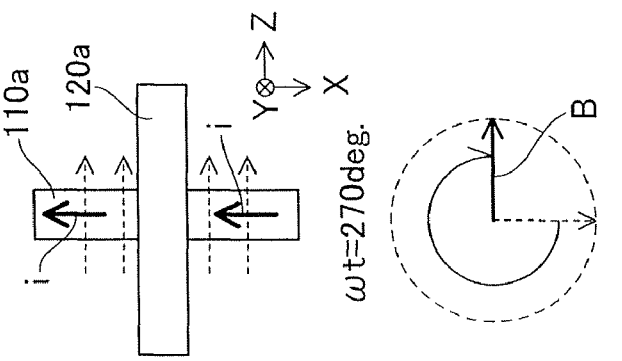
FIGS. 9A, 9B, 9C and 9D are respective diagrams for explaining a sequence of a state in which a circularly polarized magnetic field is generated, and are views of the first auxiliary coil and the second auxiliary coil from the air bearing surface (ABS) side.

FIG. 9A illustrates a state in which $\omega t = 0$. Therefore, the high frequency current is applied only to the second auxiliary coil 120 (120a) at the maximum amplitude value. In other words, the high frequency current (i) is applied in the Z direction as illustrated in the drawing to the second linear body part 120a of the second auxiliary coil 120. As a result, a magnetic field (indicated by dotted line arrows) is generated based on this current according to the so-called right-handed screw rule. This state is set, as a matter of convenience, as a starting point for explaining the generation of a circularly polarized magnetic field. In addition, the circle illustrated at the bottom of FIG. 9A is a circle to assist in explaining the generation of the circularly polarized magnetic field. Arrow B shown within the circle indicates the direction of the magnetic field.

Figure 9B:
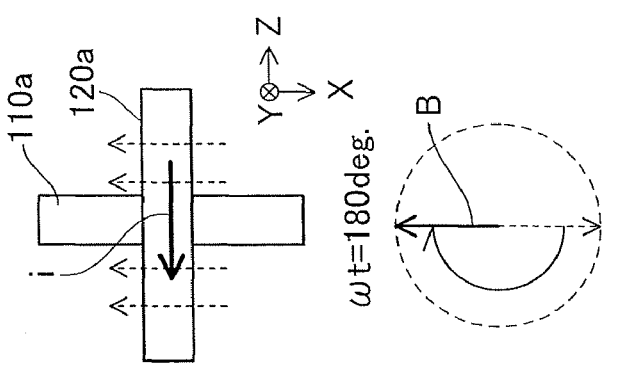

FIG. 9B, which shows the next step, illustrates a state in which $\omega t = 90$ degrees. Therefore, the high frequency current is applied only to the first auxiliary coil 110 (110a) at the maximum amplitude value. In other words, the high frequency current (i) is applied in the X direction as illustrated in the drawing to the first linear body part 110a of the first auxiliary coil 110. As a result, a magnetic field (indicated by dotted line arrows) is generated based on this current according to the so-called right-handed screw rule. In addition, the circle illustrated at the bottom of FIG. 9B is a circle to assist in explaining the generation of the circularly polarized magnetic field. The arrow B shown within the circle indicates the direction of the magnetic field. Between $0 < \omega t < 90$ degrees, a vector sum of the magnetic fields resulted from the high frequency currents applied respectively to the first linear body part 110a of the first auxiliary coil 110 and the second linear body part 120a of the second auxiliary coil 120, which produce the 90-degree phase difference, results a ¼ circular arc illustrated in the drawing.

Figure 9C:
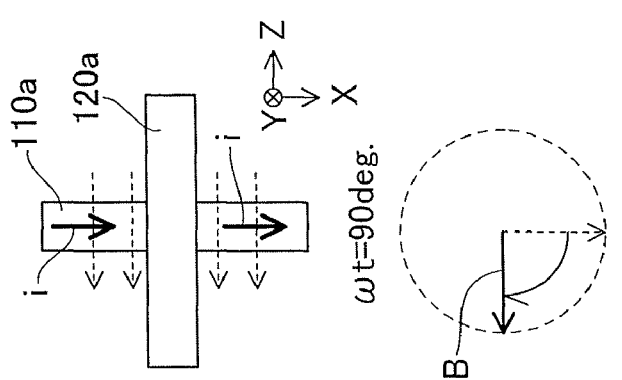

FIG. 9C, which shows the next step, illustrates a state in which $\omega t = 180$ degrees. Therefore, the high frequency current is applied only to the second auxiliary coil 120 (120a) at the maximum amplitude value. In other words, the high frequency current (i) is applied in the −Z direction as illustrated in the drawing to the second linear body part 120a of the second auxiliary coil 120. As a result, a magnetic field (indicated by dotted line arrows) is generated based on this current according to the so-called right-handed screw rule. In addition, the circle illustrated at the bottom of FIG. 9C is a circle to assist in explaining the generation of the circularly polarized magnetic field. The arrow B shown within the circle indicates the direction of the magnetic field. Between $90 < \omega t < 180$ degrees, the vector sum of the magnetic fields resulted from the high frequency currents applied respectively to the first linear body part 110a of the first auxiliary coil 110 and the second linear body part 120a of the second auxiliary coil 120, which produce the 90-degree phase difference, results the ¼ circular arc illustrated in the drawing.

Figure 9D:
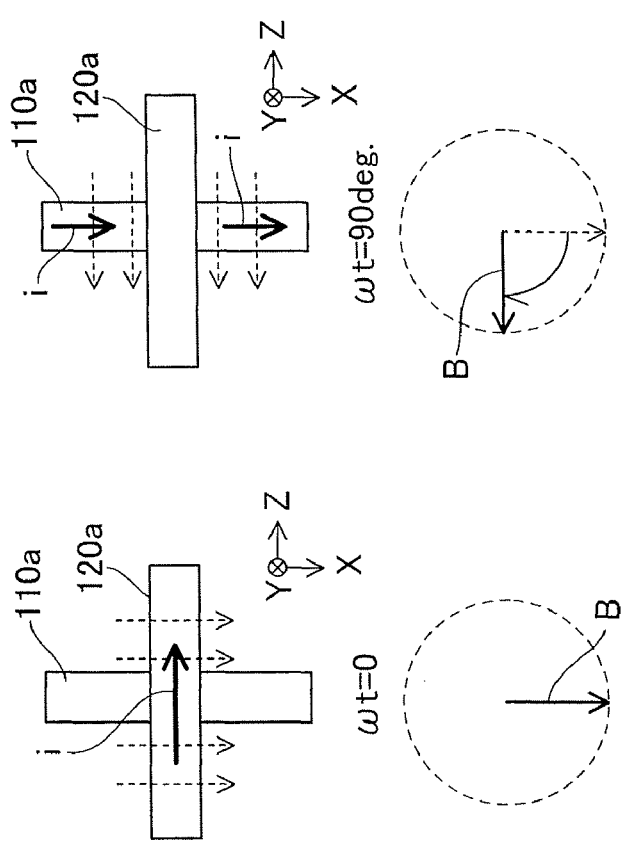

FIG. 9D, which shows the next step, illustrates a state in which ωt=270 degrees. Therefore, the high frequency current is applied only to the first auxiliary coil 110 (110a) at the maximum amplitude value. In other words, the high frequency current (i) is applied in the −X direction as illustrated in the drawing to the first linear body part 110a of the first auxiliary coil 110. As a result, a magnetic field (indicated by dotted line arrows) is generated based on this current according to the so-called right-handed screw rule. In addition, the circle illustrated at the bottom of FIG. 9D is a circle to assist in explaining the generation of the circularly polarized magnetic field. The arrow B shown within the circle indicates the direction of the magnetic field. Between 180<ωt<270 degrees is, the vector sum of the magnetic fields resulted from the high frequency currents applied respectively to the first linear body part 110a of the first auxiliary coil 110 and the second linear body part 120a of the second auxiliary coil 120, which produce the 90-degree phase difference, results the ¼ circular arc illustrated in the drawing.

After the state illustrated in FIG. 9D, the process returns to the state in FIG. 9A. Between 270<ωt<360 degrees is (same as 0 degrees), the vector sum of the magnetic fields resulted from the high frequency currents applied respectively to the first linear body part 110a of the first auxiliary coil 110 and the second linear body part 120a of the second auxiliary coil 120, which produce the 90-degree phase difference, results the ¼ circular arc.

It is understood that, through the states illustrated in FIG. 9A, FIG. 9B, FIG. 9C and FIG. 9D in sequential order and by returning to the state illustrated in FIG. 9A, the circularly polarized magnetic field (example of clockwise rotation) is generated from the ABS 70 as an assistance magnetic field. In addition, a counterclockwise-rotation circularly polarized magnetic field is also obviously possible by appropriately changing the combination of mutual current directions.

Second Embodiment

Next, a second embodiment in which three auxiliary coils are used is described with reference to FIGS. 10-13.

Figure 11:
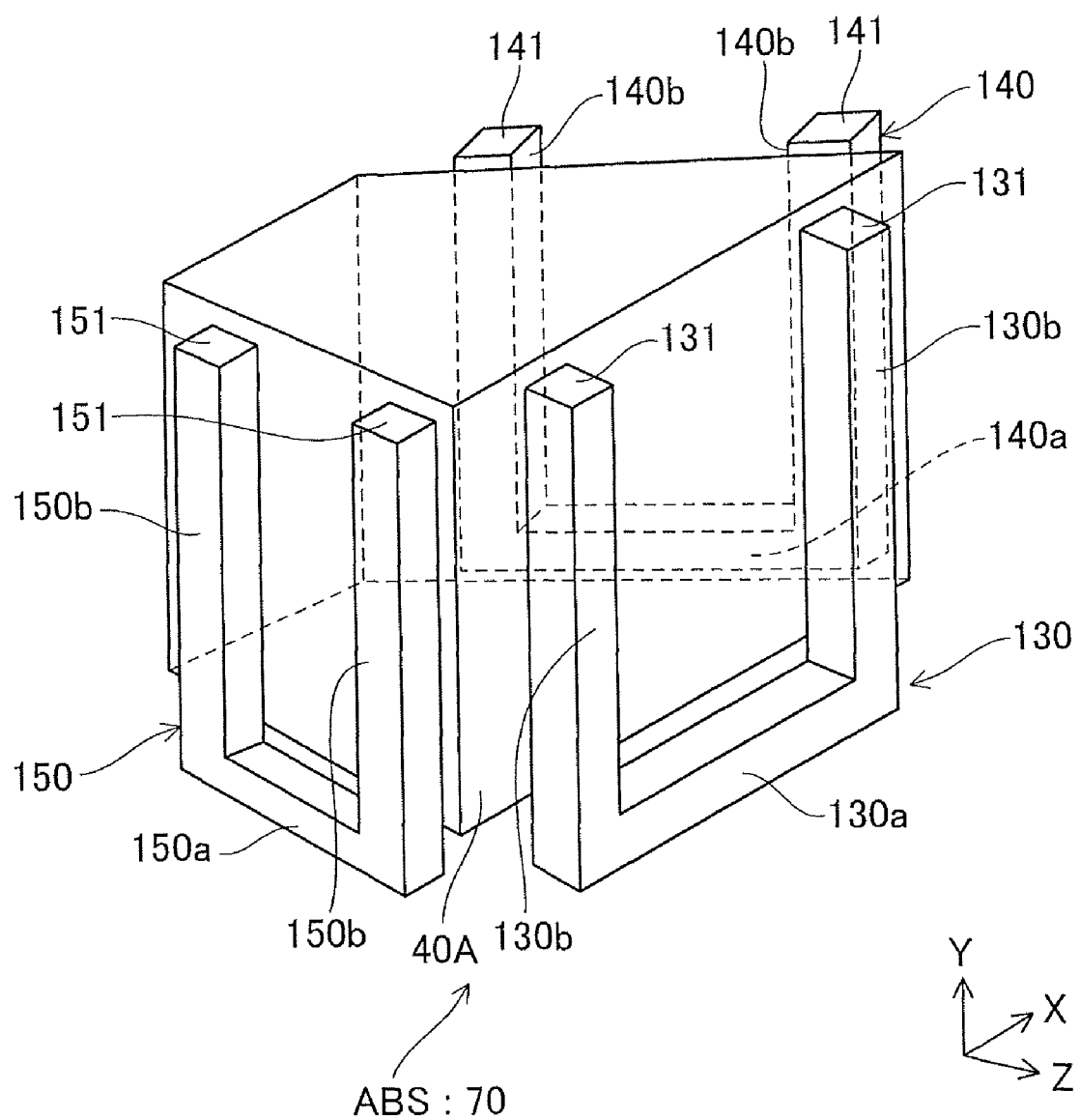
FIG. 11 is a schematic perspective view diagrammatically illustrating a state in which three auxiliary coils are arranged in the periphery of the writing main pole. The bottom side of the drawing corresponds to the ABS.
Figure 12:
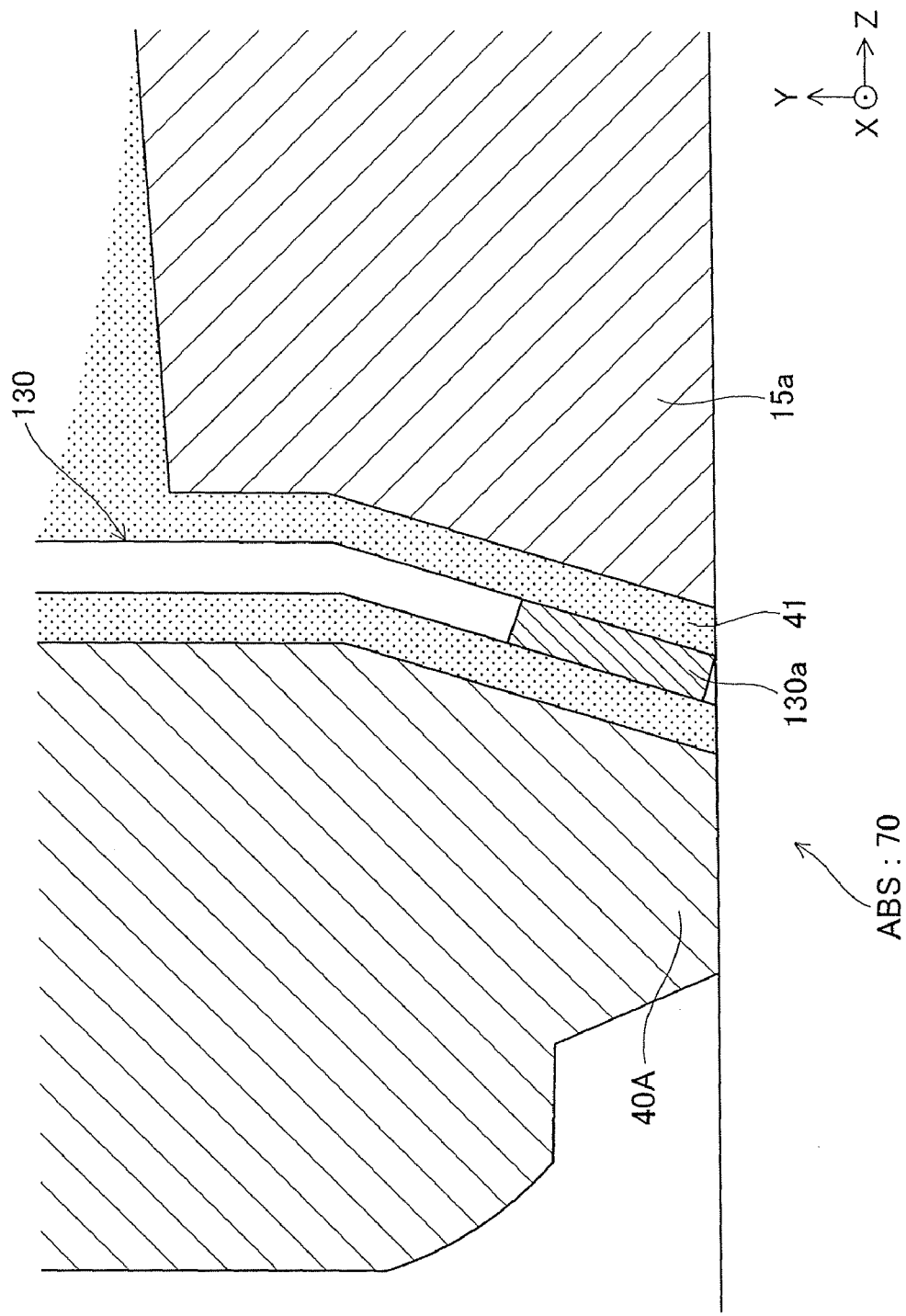
FIG. 12 is a cross sectional view in the direction of the line indicated by arrow I shown in FIG. 10.
Figure 13:
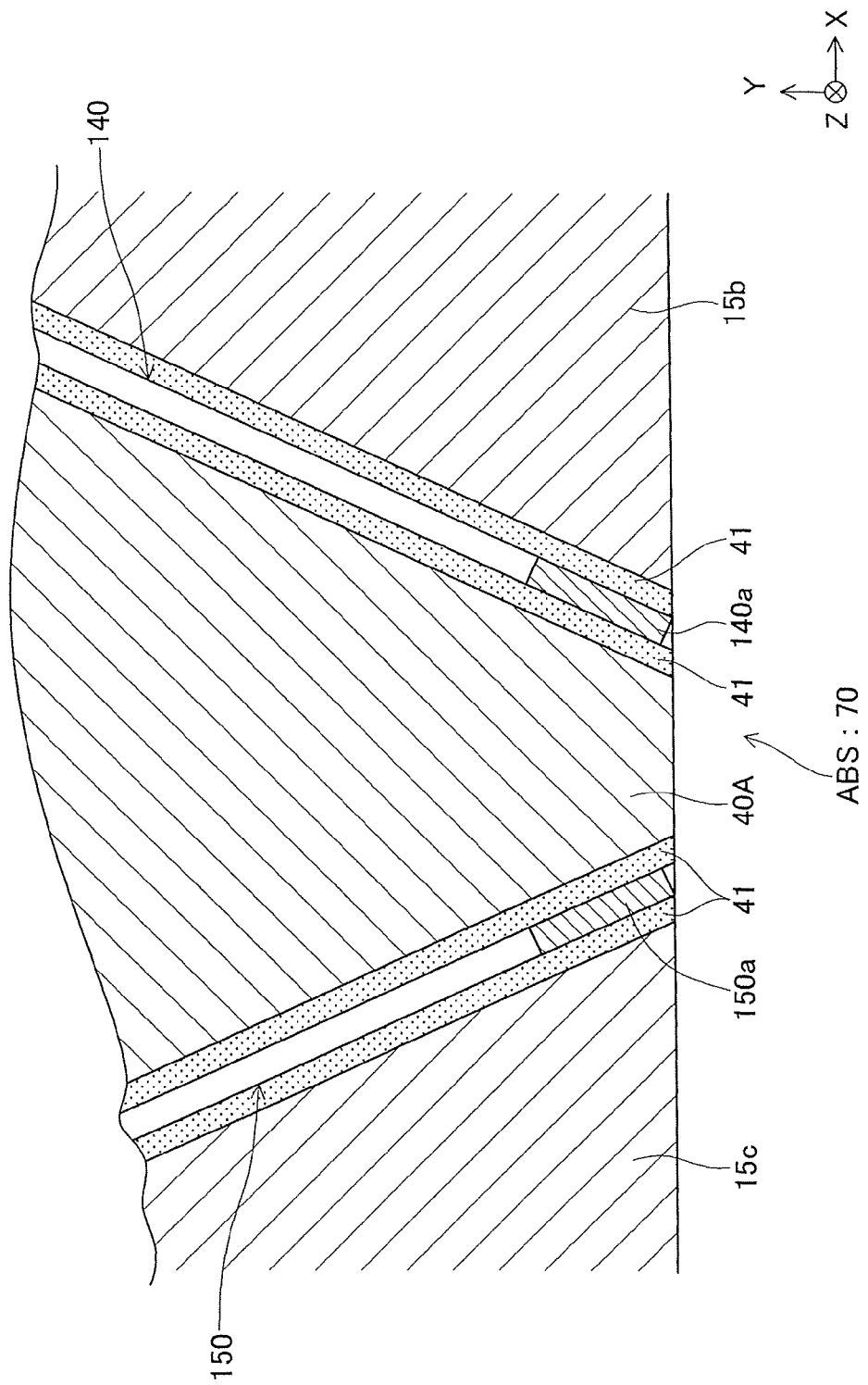
FIG. 13 is a cross sectional view in the direction of the line indicated by arrow II shown in FIG. 10.

FIG. 10 is a plan view of the writing pole part (main pole) 40A and the periphery thereof from the ABS 70 side. FIG. 11 is a schematic perspective view depicting a state in which three auxiliary coils are arranged in the periphery of the writing pole part (main pole) 40A, and the bottom side of the drawing corresponds to the ABS 70. FIG. 12 is a cross sectional view in the direction of the line indicated by arrow I shown in FIG. 10. FIG. 13 is a cross sectional view in the direction of the line indicated by arrow II shown in FIG. 10.

As illustrated in FIG. 10 and FIG. 11, three auxiliary coils 130, 140 and 150 are arranged and formed so as to surround the writing pole part (main pole) 40A.

As illustrated in FIG. 10, magnetic shield parts 15a, 15b and 15c are formed so as to surround the writing pole part (main pole) 40A positioned nearly in the center of the drawing. In other words, a trailing side shield part 15a is arranged in the Z direction (trailing side) of the writing pole part (main pole) 40A. A first side shield part 15b is arranged in the X direction of the writing pole part (main pole) 40A. A second side shield part 15c is arranged in the −X direction of the writing pole part (main pole) 40A. These magnetic shield parts 15a, 15b and 15c form shield (auxiliary) poles having the so-called wrap-around structure. Notation 41 is a magnetic gap film formed from a nonmagnetic material.

As illustrated in FIG. 10 and FIG. 11, the first auxiliary coil 130 is arranged between the writing pole part 40A and the trailing side shield part 15a. The second auxiliary coil 140 is arranged between the writing pole part 40A and the first side shield part 15b. The third auxiliary coil 150 is arranged between the writing pole part 40A and the second side shield part 15c.

As illustrated in FIG. 11, the first auxiliary coil 130 includes a first linear body part 130a that is linearly arranged along the ABS, and first linear main bodies 130b, 130b that extend in the Y direction (interior side (rearward)) from both end parts of the first linear body part 130a. In the drawing, although the first linear main bodies 130b, 130b are depicted only to the end surface indicated by notation 131 due to the limitation of the sheet size, in actuality the first linear main bodies 130b, 130b are not cut off at this location. However, the first linear main bodies 130b, 130b extend further in the Y direction and are connected to a microwave current supply means.

The second auxiliary coil 140 includes a second linear body part 140a that is linearly arranged along the ABS, and second linear main bodies 140b, 140b that extend in the Y direction (interior side (rearward)) from both end parts of the second linear body part 140a. In the drawing, although the second linear main bodies 140b, 140b are depicted only to the end surface as indicated by notation 141 due to the limitation of the sheet size, in actuality the second linear main bodies 140b, 140b are not cut off at this location. However, the second linear main bodies 140b, 140b extend further in the Y direction and are connected to a microwave current supply means.

The third auxiliary coil 150 includes a third linear body part 150a that is linearly arranged along the ABS, and third linear main bodies 150b, 150b that extend in the Y direction (interior side (rearward)) from both end parts of the third linear body part 150a. In the drawing, although the third linear main bodies 150b, 150b are depicted only to the end surface as indicated by notation 151 due to the limitation of the sheet size, in actuality the third linear main bodies 150b, 150b are not cut off but at this location. However, the third linear main bodies 150b, 150b extend further in the Y direction and are connected to a microwave current supply means.

As illustrated in FIG. 10, the second linear body part 140a and the third linear body part 150a are each arranged to have a substantially orthogonal positional relationship to the first linear body part 130a.

Here, the phrase "substantially orthogonal positional relationship" indicates a range of 90°±25°.

As illustrated in FIG. 10, FIG. 12 and FIG. 13, the area in which the first auxiliary coil 130, the second auxiliary coil 140 and the third auxiliary coil 150 exist is a space filled in with a nonmagnetic material.

As described above, the microwave current supply means for applying microwave current is connected to each of the first auxiliary coil 130, the second auxiliary coil 140, and the third auxiliary coil 150.

Figure 16:
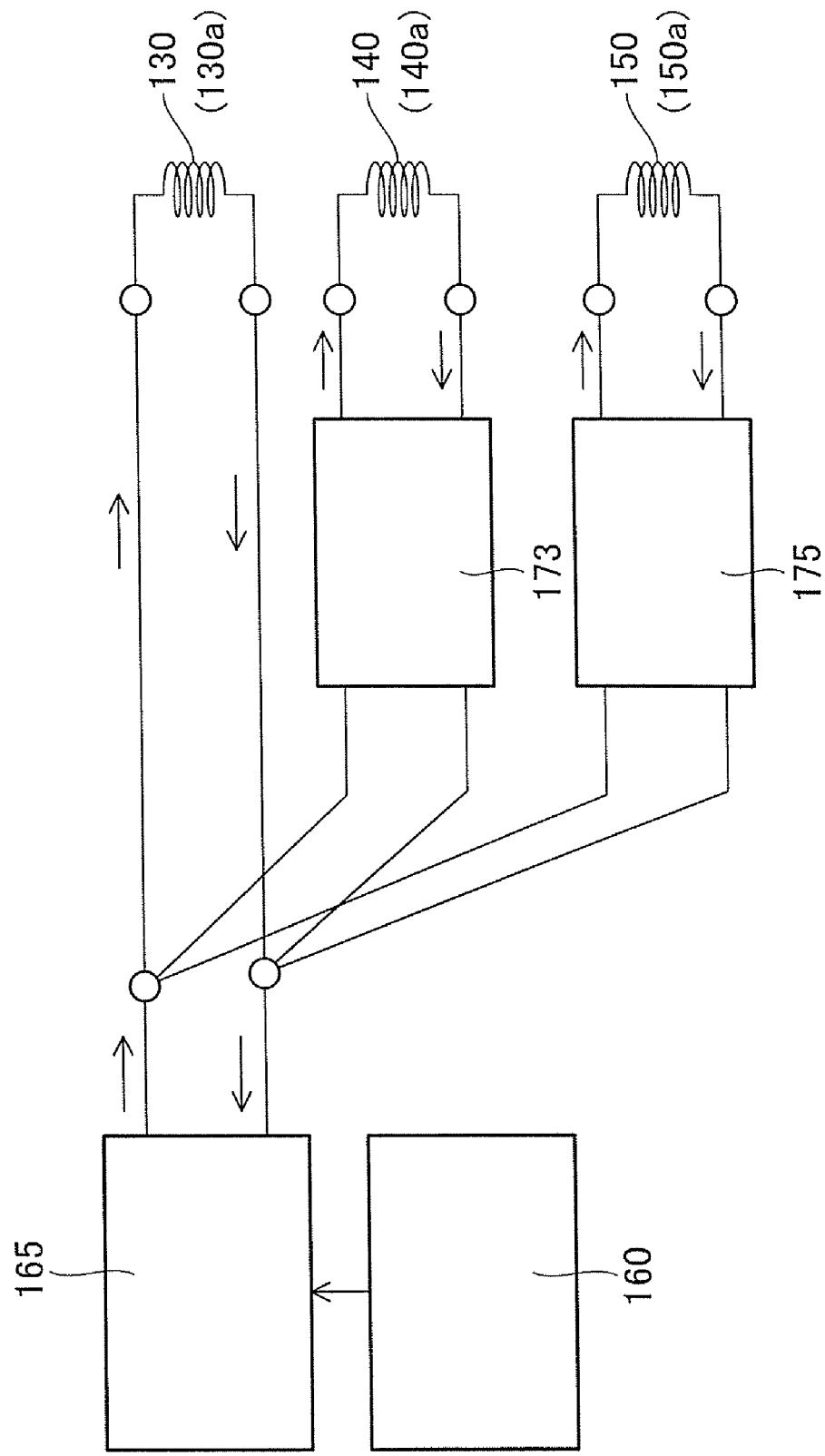
FIG. 16 is a schematic circuit diagram of a configuration in which phase differences in microwave currents applied respectively to the first auxiliary coil, the second auxiliary coil, and the third auxiliary coil are 90 degrees.

The microwave current supply means includes, for example, a phase shifter interposed at a middle step in the connection so that phase differences between the microwave currents applied respectively to the first auxiliary coil 130, the second auxiliary coil 140 and the third auxiliary coil 150 can be changed. In the present invention, a configuration is provided so that the circularly polarized magnetic field is generated as an assistance magnetic field from the ABS 70 by the microwave current applied respectively to the first auxiliary coil 130, the second auxiliary coil 140 and the third auxiliary coil 150. Therefore, the microwave currents respectively applied to the second auxiliary coil 140 and the third auxiliary coil 150 are configured so that the phase differences relative to the first auxiliary coil 130 are produced at 90 degrees. The phase differences may be either positive or negative. For example, as illustrated in the schematic circuit diagram of FIG. 16, a high frequency current drive source 165 is prepared as the microwave current supply means. The current drive or the like of the high frequency current drive source 165 is controlled based on, for example, control signals from an HDD controller 160. In addition, although the microwave current (high frequency current) is respectively applied from the high frequency current drive source 165 to the first auxiliary coil 130, the second auxiliary coil 140 and the third auxiliary coil 150, 90-degree phase shifters 173 and 175 are preferably interposed in two wire circuits (for example, on the second auxiliary coil 140 side and on the third auxiliary coil 150 side as illustrated in the drawing) to change the phase differences of the microwave currents respectively applied to the second auxiliary coil 140 and the third auxiliary coil 150 by 90 degrees in relation to the first auxiliary coil 130. In order to ensure the phase differences, the wiring is preferably provided to configure with branch circuits from the same power source as illustrated in FIG. 16.

Moreover, the microwave current supply means in the present invention conceptually includes the means to change the phase difference (for example, the 90-degree phase shifters).

Accordingly, the circularly polarized magnetic field is generated as an assistance magnetic field by making the phase differences of the microwave currents (high frequency currents) applied from the high frequency current drive source 165 respectively to the second auxiliary coil 140 and the third auxiliary coil 150 to be 90 degrees in relation to the microwave current applied to the first auxiliary coil 130. This state is explained with reference to FIG. 14A, FIG. 14B, FIG. 14C, and FIG. 14D.

FIG. 14A, FIG. 14B, FIG. 14C and FIG. 14D are diagrams that view the first auxiliary coil 130, the second auxiliary coil 140 and the third auxiliary coil 150 from the ABS 70 side. The second linear body part 140a of the second auxiliary coil 140 and the third linear body part 150a of the third auxiliary coil 150 are each arranged to have a substantially orthogonal positional relationship to the first linear body part 130a of the first auxiliary coil 130. As described above, the phrase "substantially orthogonal positional relationship" indicates a range of 90°±25°.

In these drawings, the phases of the second auxiliary coil 140 and the third auxiliary coil 150 are greater than the phase of the first auxiliary coil 130 by 90 degrees. In other words, when a waveform that takes into account the phase of the high frequency currents applied to the second auxiliary coil 140 and the third auxiliary coil 150 is sin (ωt+90), the waveform that takes into account the phase of the high frequency current applied to the first auxiliary coil 30 is expressed as sin (ωt).

FIG. 14A illustrates a state in which ωt=0. Therefore, the high frequency currents are applied to the second auxiliary coil 140 (140a) and the third auxiliary coil 150 (150a) at the maximum amplitude value. In other words, the high frequency currents (i) are applied in nearly the Z direction as illustrated in the drawing to the second linear body part 140a of the second auxiliary coil 140 and the third linear body part 150a of the third auxiliary coil 150. As a result, a magnetic field (indicated by dotted line arrows) is generated based on these currents according to the so-called right-handed screw rule. This state is set, as a matter of convenience, as a starting point for explaining the generation of a circularly polarized magnetic field. In addition, the circle illustrated at the bottom of FIG. 14A is a circle to assist in explaining the generation of the circularly polarized magnetic field. Arrow B shown within the circle indicates the direction of the magnetic field.

FIG. 14B, which shows the next step, illustrates a state in which ωt=90 degrees. Therefore, the high frequency current is applied to the first auxiliary coil 130 (130a) at the maximum amplitude value. In other words, the high frequency current (i) is applied in the X direction as illustrated in the drawing to the first linear body part 130a of the first auxiliary coil 130. As a result, a magnetic field (indicated by dotted line arrows) is generated based on this current according to the so-called right-handed screw rule. The circle illustrated at the bottom of FIG. 14B is a circle to assist in explaining the generation of the circularly polarized magnetic field. The arrow B shown within the circle indicates the direction of the magnetic field. Moreover, between 0<ωt<90 degrees is, a vector sum of the magnetic fields resulted from the high frequency current of applied respectively to the first linear body part 130a of the first auxiliary coil 130, the second linear body part 140a of the second auxiliary coil 140 and the third linear body part 150a of the third auxiliary coil 150, which produce the 90 degree phase difference, results a ¼ circular arc as illustrated.

FIG. 14C, which shows the next step, illustrates a state in which ωt=180 degrees. Therefore, the high frequency currents are applied to the second auxiliary coil 140 (140a) and the third auxiliary coil 150 (150a) at the maximum amplitude value. In other words, the high frequency currents (i) are applied in nearly the −Z direction as illustrated in the drawing to the second linear body part 140a of the second auxiliary coil 140 and the third linear body part 150a of the third auxiliary coil 150. As a result, a magnetic field (indicated by dotted line arrows) is generated based on these currents according to the so-called right-handed screw rule. The circle illustrated at the bottom of FIG. 14C is a circle to assist in explaining the generation of the circularly polarized magnetic field. The arrow B shown within the circle indicates the direction of the magnetic field. Moreover, between 90<ωt<180 degrees is, the vector sum of the magnetic fields resulted from the high frequency currents applied respectively to the first linear body part 130a of the first auxiliary coil 130, the second linear body part 140a of the second auxiliary coil 140, and the third linear body part 150a of the third auxiliary coil 150, which produce the 90-degree phase difference, results the ¼ circular arc as illustrated.

FIG. 14D, which shows the next step, illustrates a state in which ωt=270 degrees. Therefore, the high frequency current is applied to the first auxiliary coil 130 (130a) at the maximum amplitude value. In other words, the high frequency current (i) is applied in the −X direction as illustrated in the drawing to the first linear body part 130a of the first auxiliary coil 130. As a result, a magnetic field (indicated by dotted line arrows) is generated based on this current according to the so-called right-handed screw rule. The circle illustrated at the bottom of FIG. 14D is a circle to assist in explaining the generation of circularly polarized magnetic field. The arrow B shown within the circle indicates the direction of the magnetic field. In addition, between 180<ωt<270 degrees is, the vector sum of the magnetic fields resulted from the high frequency currents applied respectively to the first linear body part 130a of the first auxiliary coil 130, the second linear body part 140a of the second auxiliary coil 140, and the third linear body part 150a of the third auxiliary coil 150, which produce the 90-degree phase difference, results the ¼ circular arc as illustrated.

After the state illustrated in FIG. 14D, the process returns to the state in FIG. 14A. Moreover, between 180<ωt<360 degrees (same as 0 degrees), the vector sum of the magnetic fields resulted from the high frequency currents applied respectively to the first linear body part 130a of the first auxiliary coil 130, the second linear body part 140a of the second auxiliary coil 140, and the third linear body part 150a of the third auxiliary coil 150, which produce the 90-degree phase difference, results the ¼ circular arc as illustrated.

It is understood that, through the states illustrated in FIG. 14A, FIG. 14B, FIG. 14C and FIG. 14D are in sequential order and by returning to the state illustrated in FIG. 9A, the circularly polarized magnetic field (example of clockwise rotation) is generated from the ABS 70 as an assistance magnetic field. In addition, a counterclockwise-rotation circularly polarized magnetic field is also obviously possible appropriately changing the combination of mutual current directions.

Furthermore, the microwave assisted magnetic head according to the present invention is not limited to the stricture of the normal magnetic head in which the writing pole part 40A has a size that fits within a single recording track. The microwave assisted magnetic head according to the present invention may also include a structure in which the writing pole part 40A has a size that extends over several track pitches and may be used as a so-called shingle magnetic recording magnetic head in which a head is gradually shifted in the radial direction of the medium and overlaps the writing of data.

Moreover, the microwave assisted magnetic head according to the present invention may be formed by using thin film formation technology or the like that utilizes a vacuum process.

DESCRIPTION OF THE EXPERIMENTAL EXAMPLE

The invention of the thin film magnetic head (microwave assisted magnetic head) that provides a microwave assistance function as described above can be realized as explained in detail below.

Experimental Example

A microwave assisted magnetic head made from the configuration illustrated in FIG. 8 is assumed. The space (recording gap space) between the writing pole part (main pole) 40A and the auxiliary pole 17, which is a shield, is configured to be 30 nm. The wire diameter (thickness) of the first auxiliary coil 110 and the second auxiliary coil 120 is configured to be 5 nm. The length of the first linear body part 110a and the second linear body part 120a is configured to be 20 nm. With such configurations, the first linear body part 110a and the second linear body part 120a can be physically arranged in a cross shape as illustrated in the drawing. In this case, the second auxiliary coil 120 may be arranged with a 5-nm space on the writing pole part (main pole) 40A side and a 5-nm space on the auxiliary pole 17 side that is a shield.

Further, when the high frequency currents is respectively applied to the first auxiliary coil 110 and the second auxiliary coil 120, respectively, with a phase difference of 90 degrees, in principle, a circularly polarized magnetic field is to be generated as an assistance magnetic field from the ABS 70.

As described above, the microwave assisted magnetic head according to the present invention is configured to include at least two or more auxiliary coils that are arranged in a periphery of the writing main pole; and microwave current supply means that applies microwave currents to the at least two or more auxiliary coils. Wherein, the at least two or more auxiliary coils respectively include linear body parts linearly arranged on an air bearing surface (ABS) side, two of the linear body parts of the at least two or more auxiliary coils are arranged in a substantially orthogonal positional relationship, and the microwave current supply means is configured such that the microwave current supply means changes a phase difference of the microwave currents applied respectively to the at least two or more auxiliary coils. Therefore, the microwave assisted magnetic head easily controls microwave current (high frequency current) and can generate a circularly polarized magnetic field with a high magnetization inversion ratio as an assistance magnetic field.

What is claimed is:

1. A microwave assisted magnetic head, comprising:
    a writing main pole;
    a writing coil that generates a writing magnetic field at the writing magnetic field part;
    at least two or more auxiliary coils that are arranged in a periphery of the writing main pole; and
    microwave current supply means that applies microwave currents to the at least two or more auxiliary coils, wherein
    the at least two or more auxiliary coils respectively include linear body parts linearly arranged on an air bearing surface (ABS) side,
    two of the linear body parts of the at least two or more auxiliary coils are arranged in a substantially orthogonal positional relationship, and
    the microwave current supply means is configured such that the microwave current supply means changes a phase difference of the microwave currents applied respectively to the at least two or more auxiliary coils.

2. The microwave assisted magnetic head according to claim 1, comprising:
    a writing main pole;
    an auxiliary pole;
    a writing coil that generates a writing magnetic field at the writing main pole;
    a first auxiliary coil and a second auxiliary coil that are arranged between the writing main pole and the auxiliary pole;
    microwave current supply means that applies microwave currents to the first auxiliary coil and the second auxiliary coil, wherein
    the first auxiliary coil includes a first linear body part linearly arranged on an air bearing surface side (ABS),
    the second auxiliary coil includes a second linear body part linearly arranged on the ABS side, and the first linear body part and the second linear body part are orthogonally arranged in a crossed shape in a separated state, and
    the microwave current supply means is configured such that the microwave current supply means changes a phase difference of the microwave currents applied respectively to the first auxiliary coil and the second auxiliary coil.

3. The microwave assisted magnetic head according to claim 2, wherein
    the phase difference of the microwave currents applied respectively to the first auxiliary coil and the second auxiliary coil are configured at 90 degrees.

4. The microwave assisted magnetic head according to claim 2, wherein
    a circularly polarized magnetic field is generated as an assistance magnetic field by the microwave currents applied respectively to the first auxiliary coil and the second auxiliary coil.

5. The microwave assisted magnetic head according to claim 1, comprising:
    a writing main pole;

a shield (auxiliary) pole that is formed so as to surround the writing main pole and that includes a trailing side shield part, a first side shield part and a second side shield part;

a writing coil that generates a writing magnetic field at the writing main pole;

a first auxiliary coil that is arranged between the writing main pole and the trailing side shield part;

a second auxiliary coil that is arranged between the writing main pole and the first side shield part;

a third auxiliary coil that is arranged between the writing main pole and the second side shield part; and microwave current supply means that applies microwave currents to the first auxiliary coil, the second auxiliary coil and the third auxiliary coil, wherein the first auxiliary coil includes a first linear body part linearly arranged on an air bearing surface (ABS) side, the second auxiliary coil includes a second linear body part linearly arranged on the ABS side, the third auxiliary coil includes a third linear body part linearly arranged on the ABS side, the second linear body part and the third linear body part are each arranged to have a substantially orthogonal positional relationship relative to the first linear body part, and the microwave current supply means is configured such that the microwave current supply means changes phase differences of the microwave currents applied respectively to the first auxiliary coil, the second auxiliary coil and the third auxiliary coil.

6. The microwave assisted magnetic head according to claim 5, wherein the phase difference of the microwave currents applied respectively to the second auxiliary coil and the third auxiliary coil are configured at 90 degrees relative to the first auxiliary coil.

7. The microwave assisted magnetic head according to claim 5, wherein a circularly polarized magnetic field is generated as an assistance magnetic field by the microwave currents applied respectively to the first auxiliary coil, the second auxiliary coil, and the third auxiliary coil.

8. A head gimbal assembly, comprising:

a slider that includes the microwave assisted magnetic head according to claim 1 and that is arranged opposing the recording medium; and a suspension that flexibly supports the slider.

9. A magnetic disk device, comprising:

a slider that includes the microwave assisted magnetic head according to claim 1 and that is arranged opposing the recording medium; and a positioning device that determines a position relative to the recording medium while supporting the slider.

* * * * *